US011493932B2

(12) United States Patent
Regev et al.

(10) Patent No.: US 11,493,932 B2
(45) Date of Patent: Nov. 8, 2022

(54) POOL CLEANING ROBOT AND A METHOD FOR IMAGING A POOL

(71) Applicant: MAYTRONICS LTD., Kibbutz Yizrael (IL)

(72) Inventors: Ofer Regev, Tel-Adashim (IL); Assy Tzalik, Magen Shaul (IL); Yair Hadari, Kibbutz Hulata (IL); Shay Witelson, Kibbutz Yizrael (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 388 days.

(21) Appl. No.: 16/266,071

(22) Filed: Feb. 3, 2019

(65) Prior Publication Data

US 2020/0249690 A1  Aug. 6, 2020

(51) Int. Cl.
*G05D 1/02* (2020.01)
*E04H 4/16* (2006.01)

(52) U.S. Cl.
CPC ......... *G05D 1/0246* (2013.01); *E04H 4/1654* (2013.01); *G05D 1/0206* (2013.01); *G05D 1/0274* (2013.01); *G05D 2201/0203* (2013.01)

(58) Field of Classification Search
CPC .. G05D 1/0246; G05D 1/0206; G05D 1/0274; G05D 2201/0203; E04H 4/1654
See application file for complete search history.

(56) References Cited

U.S. PATENT DOCUMENTS

| 6,812,846 | B2 * | 11/2004 | Gutta | G06T 7/97 |
| | | | | 340/603 |
| 2015/0000068 | A1 * | 1/2015 | Tsuboi | A47L 9/19 |
| | | | | 15/319 |
| 2017/0234976 | A1 * | 8/2017 | Grauer | G01S 17/89 |
| | | | | 356/5.04 |
| 2017/0336381 | A1 * | 11/2017 | Zeevi | A01K 63/04 |
| 2017/0355081 | A1 * | 12/2017 | Fisher | H04N 5/33 |
| 2018/0264999 | A1 * | 9/2018 | Salter | B60Q 1/24 |
| 2018/0283030 | A1 * | 10/2018 | Ellis | B63H 23/12 |
| 2019/0087548 | A1 * | 3/2019 | Bennett | G05D 1/0297 |

OTHER PUBLICATIONS

Carreras et al., Vision-based_localization_of_an_underwater_robot_in_a_structured_environment. Sep. 11-19, 2003. IEEE (Year: 2003).*

* cited by examiner

Primary Examiner — Tyler J Lee
Assistant Examiner — Yufeng Zhang
(74) Attorney, Agent, or Firm — Reches Patents

(57) ABSTRACT

A method for cleaning a region of a pool, the method may include moving a pool cleaning robot along a cleaning path that covers the region while acquiring, at first different points of time and by a sensing unit of the pool cleaning robot, first images of first scenes, at least one first scene at each first point of time; wherein the acquiring of the first images is executed while illuminating the first scenes by the pool cleaning robot; detecting, in at least one first image, illumination reflected or scattered as a result of the illuminating of the first scenes; removing from the at least one first image information about the illumination reflected or scattered; determining, based at least in part of on the first images, first locations of the pool cleaning robot; and wherein the moving is responsive to the first locations of the pool cleaning robot.

12 Claims, 24 Drawing Sheets

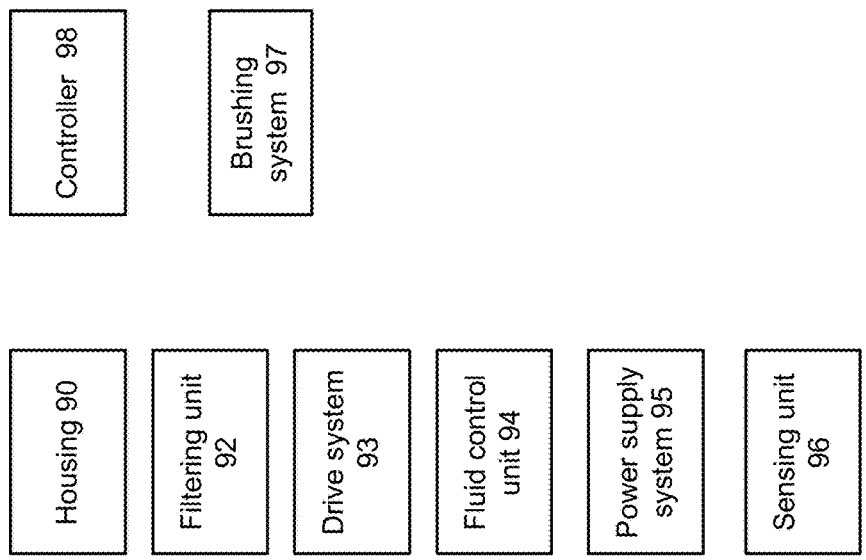

POOL CLEANING ROBOT AND A METHOD FOR IMAGING A POOL

BACKGROUND

Pool cleaning robot s such as pool cleaning robots are known in the art. They are expected to clean the pool by brushing the surfaces of the pool and filtering the pumped fluid of the pool by removing foreign particles and debris from that fluid.

It is of importance that the pool cleaning robot navigates in an effective and efficient way so that it may reach and cover the entire area of the pool that it is programmed to within a specified cleaning cycle.

Pool cleaning robots may also be required to deal with pool built fixtures such as climbing on vertical wall surfaces, stairs, ledges, and the like.

Pool cleaning robots may be required to traverse various additional obstacles that may be mounted in the pool areas. Such as, for example: spot lamps, return jet outlets, ladders and the like or irregular pool shapes or contours, steep angles, main drains, stairs, permanent structures such as for example bar and stools or temporary elements such as for example toys, gym apparatus, any special equipment that may be installed in the swimming pool whether it be a fixed or a removable installation and the like.

There is a continually growing need to provide a pool cleaning robot that is capable of travelling, traversing obstacles, reckoning its position location in a precise, efficient and effective manner SUMMARY There may be provided a method for cleaning a region of a pool, the method may include moving a pool cleaning robot along a cleaning path that covers the region while acquiring, at first different points of time and by a sensing unit of the pool cleaning robot, first images of first scenes, at least one first scene at each first point of time; wherein the acquiring of the first images may be executed while illuminating the first scenes by the pool cleaning robot; detecting, in at least one first image, illumination reflected or scattered as a result of the illuminating of the first scenes; removing from the at least one first image information about the illumination reflected or scattered; determining, based at least in part of on the first images, first locations of the pool cleaning robot; and wherein the moving may be responsive to the first locations of the pool cleaning robot.

The method may include moving the pool cleaning robot along the cleaning path while acquiring, at second points of time and by the sensing unit of the pool cleaning robot, second images of second scenes, at least one second scene per point of time; wherein the acquiring of the second images may be executed without illuminating the second scenes by the pool cleaning robot; detecting, in at least one image, a flicker; removing from the at least one image information about the flicker; determining, based on the second images of the second scenes, second locations of the pool cleaning robot; and wherein the moving may be responsive to the second locations of the pool cleaning robot.

The method may include selecting between acquiring the first images and acquiring of the second images.

The selecting may be based on a time of cleaning.

The selecting may be based on ambient illumination.

The method may include calculating at least one out of a reflection parameter and a scatter parameter of the illumination reflected or scattered.

The method may include determining at least one illumination parameter based on the at least one out of the reflection parameter and the scatter parameter.

The at least one illumination parameter may be a color of illumination.

The at least one illumination parameter may be an intensity of illumination.

The calculating may be based on one or more images acquired under different illumination conditions.

The method may include acquiring the first images by a stereoscopic camera of the sensing unit.

There may be provided a non-transitory computer readable medium that stores instructions that once executed by a pool cleaning robot cause the pool cleaning robot to execute the steps of moving the pool cleaning robot along a cleaning path that covers a region of the pool while acquiring, at first different points of time and by a sensing unit of the pool cleaning robot, first images of first scenes, at least one first scene at each first point of time; wherein the acquiring of the first images may be executed while illuminating the first scenes by the pool cleaning robot; detecting, in at least one first image, illumination reflected or scattered as a result of the illuminating of the first scenes; removing from the at least one first image information about the illumination reflected or scattered; determining, based at least in part of on the first images, first locations of the pool cleaning robot; and wherein the moving may be responsive to the first locations of the pool cleaning robot.

The illumination reflected or scattered may be reflected or scattered from turbid fluid, from a pool static element and the like.

The non-transitory computer readable medium may store instructions for moving the pool cleaning robot along the cleaning path while acquiring, at second points of time and by the sensing unit of the pool cleaning robot, second images of second scenes, at least one second scene per point of time; wherein the acquiring of the second images may be executed without illuminating the second scenes by the pool cleaning robot; detecting, in at least one image, a flicker; removing from the at least one image information about the flicker; determining, based on the second images of the second scenes, second locations of the pool cleaning robot; and wherein the moving may be responsive to the second locations of the pool cleaning robot.

The non-transitory computer readable medium may store instructions for selecting between acquiring the first images and acquiring of the second images.

The selecting may be based on a time of cleaning.

The selecting may be based on ambient illumination.

The non-transitory computer readable medium may store instructions for calculating at least one out of a reflection parameter and a scatter parameter of the illumination reflected or scattered.

The non-transitory computer readable medium may store instructions for determining at least one illumination parameter based on the at least one out of the reflection parameter and the scatter parameter.

The at least one illumination parameter may be a color of illumination.

The at least one illumination parameter may be an intensity of illumination.

The non-transitory computer readable medium may store instructions for calculating based on one or more images acquired under different illumination conditions.

The non-transitory computer readable medium may store instructions for acquiring the first images by a stereoscopic camera of the sensing unit.

There may be provided a pool cleaning robot that may include a housing; a filtering unit that may be constructed and arranged to filter fluid; a fluid control unit that may be constructed and arranged to control a flow of the fluid within the pool cleaning robot; a sensing unit; an illumination unit (that may include one or more illumination elements such as first and second LEDs, white LED and a colored LED); a processor; and a drive system; wherein the drive system may be constructed and arranged to move the pool cleaning robot along a cleaning path that covers the region; wherein the sensing unit may be constructed and arranged to acquire first images of first scenes, at first different points of time, while the pool cleaning robot moves along the cleaning path, and while the illumination unit illuminates the first scenes; wherein at least one first scene may be acquired at each first point of time; wherein the processor may be constructed and arranged to detect, in at least one first image, illumination reflected or scattered as a result of the illuminating of the first scenes; remove from the at least one first image information about the illumination reflected or scattered; determine, based at least in part of on the first images, first locations of the pool cleaning robot; and determine a manner of moving the pool cleaning robot in response to the first locations of the pool cleaning robot.

The illumination reflected or scattered may be reflected or scattered from turbid fluid, from a pool static element and the like.

The sensing unit may be constructed and arranged to acquire second images of second scenes, at second different points of time, while the pool cleaning robot moves along the cleaning path, and while the illumination unit does not illuminate the second scenes; wherein at least one second scene may be acquired at each second point of time; wherein the processor may be constructed and arranged to detect, in at least one image, a flicker; remove from the at least one image information about the flicker; determine, based at least in part of on the second images, second locations of the pool cleaning robot; and determine a manner of moving the pool cleaning robot in response to the second locations of the pool cleaning robot.

The processor may be constructed and arranged to select between acquiring the first images and acquiring of the second images.

The selecting may be based on a time of cleaning.

The selecting may be based on ambient illumination.

The processor may be constructed and arranged to calculate at least one out of a reflection parameter and a scatter parameter of the illumination reflected or scattered.

The processor may be constructed and arranged to determine at least one illumination parameter based on the at least one out of the reflection parameter and the scatter parameter.

The at least one illumination parameter may be a color of illumination.

The at least one illumination parameter may be an intensity of illumination.

The processor may be constructed and arranged to calculate based on one or more images acquired under different illumination conditions.

The sensing unit may include a stereoscopic camera that may be constructed and arranged to acquire the first images.

There may be provided non-transitory computer readable medium that stores instructions for any steps of any method listed below.

There may be provided a pool cleaning robot that is constructed and arranged to execute any steps of any method listed below.

There may be provided method for navigating a pool cleaning robot within a pool, the method may include repetitively executing, during the navigating of the pool cleaning robot, the steps of concurrently sensing, by a pool cleaning robot, distances between the pool cleaning robot and static pool elements that may be oriented from each other; estimating by a pool cleaning robot processor a location of the pool cleaning robot within the pool, based on the distances; and determining a future progress of the pool cleaning robot based on the location.

The sensing may include acquiring one or more images of the static pool elements by a stereoscopic camera of the robot.

The sensing may include illuminating a surrounding of the robot to provide an illuminated surrounding; acquiring one or more images of the illuminated surrounding; and processing the one or more images to determine whether the surrounding include the one or more static pool elements.

The illuminating may include illuminating the illuminated surroundings with different colors, at different points of time, to obtain different color images of the illuminated surroundings; and comparing between the different color images to determine whether the illuminated surroundings includes the one or more static pool elements.

The different colors may include green and another color.

The method may include receiving or generating, at least in part by the pool cleaning robot, a three dimensional representation of the pool during a learning period.

The method may include generating, by the pool cleaning robot, and during a progress over a part of the pool, a three dimensional estimate of a portion of the pool; searching a portion of the three dimensional representation of the pool that may be similar to the three dimensional estimate of the portion of the pool; and wherein the determining of the location of the pool cleaning robot within the pool may be responsive to an outcome of the searching.

There may be provided a method that may include illuminating a surrounding of a pool cleaning robot with green light to provide a green illuminated scene; acquiring an image of the green illuminated scene; estimating a penetration depth of the green light within the surrounding of the pool cleaning robot; illuminating the surrounding of the pool cleaning robot with a light of another color to provide another color illuminated scene; wherein the other color differs from green; acquiring an image of the other color illuminated scene; estimating a penetration depth of the other light within the surrounding of the pool cleaning robot; comparing between the penetration depth of the green light and the penetration depth of the other light to provide a comparison result; and determining, based on the comparison result, at least one of a location of the pool cleaning robot, and a state of water within the surroundings of the pool cleaning robot.

The method may include determining that the surroundings of the pool cleaning robot may include a sidewall of the pool when the penetration depth of the other light within the surrounding of the pool cleaning robot substantially equals the penetration depth of the green light within the surrounding of the pool cleaning robot.

The method may include determining that the surroundings of the pool cleaning robot does not may include a sidewall of the pool when the penetration depth of the other light within the surrounding of the pool cleaning robot substantially differs from the penetration depth of the green light within the surrounding of the pool cleaning robot.

There may be provided a method for cleaning a region of the pool, the method may include moving a pool cleaning robot within the region while repetitively determining a location of the pool cleaning robot based on images acquired by a stereoscopic camera of the pool cleaning robot; and cleaning the region by a pool cleaning robot during the moving of the pool cleaning robot within the region.

The method may include receiving or generating, at least in part by the pool cleaning robot, a three dimensional representation of the pool during a learning period.

The method may include repeating the steps of generating, by the pool cleaning robot, and during a progress over a part of the pool, a three dimensional estimate of a portion of the pool; searching a portion of the three dimensional representation of the pool that may be similar to the three dimensional estimate of the portion of the pool; and wherein the determining of the location of the pool cleaning robot within the pool may be responsive to an outcome of the searching.

The method may include acquiring the images; and wherein at least one image may be an image of an illuminated surroundings of the pool cleaning robot.

The method may include illuminating a surrounding of the pool cleaning robot with a warm colored illumination.

The method may include illuminating a surrounding of the pool cleaning robot with blue light.

The method may include illuminating a surrounding of the pool cleaning robot with green light.

The method may include acquiring the images and filtering our flickers from the images.

The method may include recognizing the flickers by comparing multiple images, taken at different times, of a same scene.

The stereoscopic camera may include two image sensors.

The two image sensor may be followed by at least one fish eye lens.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1C is an example of a pool cleaning robot with a mapping and localization unit (vision system);

Figure 1A:
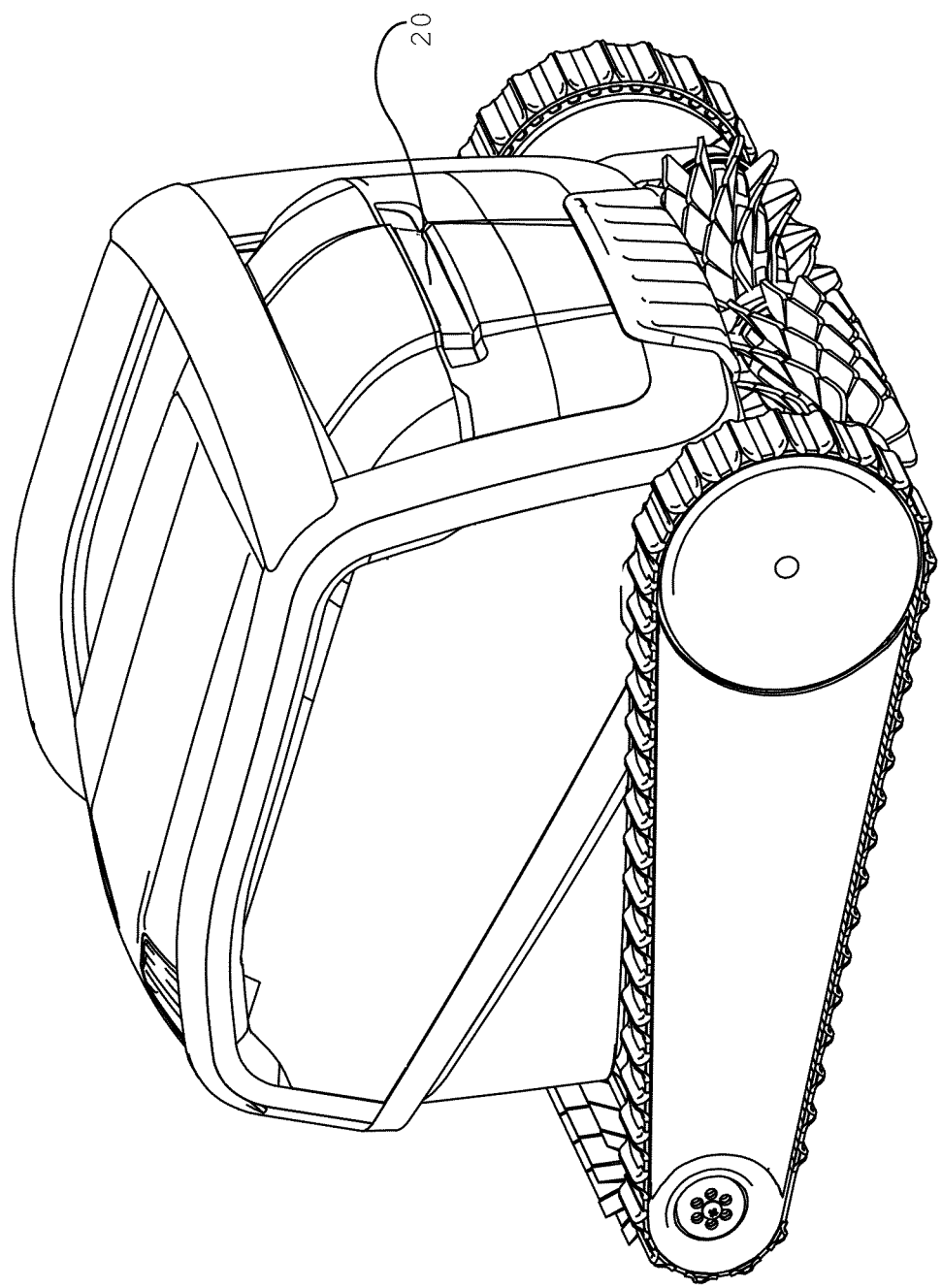
FIG. 1A is an example of a pool cleaning robot with a mapping and localization unit (vision system)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once expected by a computer result in the execution of the method.

The terms "region", "area", "portion" may be used in an interchangeable manner and may be of any shape and/or size.

A scene may be content within a field of view of a vision system. The field of view of the vision system may cover a surroundings of the pool cleaning robot.

There may be provided a pool cleaning robot (also referred to as pool cleaner) for cleaning a pool, the pool cleaning robot may include:

a. Filtering unit (denoted 92 in FIG. 1C) for filtering fluid.
b. Fluid control unit (denoted 94 in FIG. 1C) for controlling the flow of fluid within the pool cleaning robot.
c. Drive system (denoted 93 in FIG. 1C), for propelling the pool cleaning robot.
d. Brushing system (denoted 97 in FIG. 1C) for brushing dirt.
e. Body (housing) (denoted 90 in FIG. 1C) with one or more inlet and one or more outlet (the fluid flow in the pool cleaning robot between the one or more inlets and outlets).
f. Power supply system (denoted 95 in FIG. 1C) that is located within the pool cleaning robot and supplies power to components of the pool cleaning robot {the power supply system may be fed from an external electrical power supply and a tethered cable}. The power supply system may include an on board rechargeable battery system, a charging mechanism. The power supply system may include a turbine for converting a flow of fluid supplied to the pool cleaning robot to energy.
g. A sensing unit (denoted 96 in FIG. 1C) that may include a vision system (denoted 20 in FIGS. 1A, 1B and 1C). The vision system is also referred to as mapping and localization system or a stereoscopic vision system or a three-dimensional (3D) stereoscopic vision system or integrated vision PCB.
h. Controller (denoted 98 in FIG. 1C) that may be configured to control the at least one steering element, pumping element based on actual photographs captured by the pool cleaning robot vision system.

The vision system 20 may be configured to photographing the actual surrounding area of a pool cleaning robot in order to recognize and memorize the entire environment of the pool, the subsequent actual location and orientation of the pool cleaning robot in relation the pool walls, floor, fixtures, structures, pool elements such as ladder, Jet, pool light, stairs, VGB and the like; and, at least one steering element that may be configured to move the pool cleaning robot along a cleaning path, during a cleaning cycle process of a certain region of a floor or a sidewall of the pool; wherein the certain region may be partially or fully submerged.

The 3D vision enables the pool cleaning robot to create a map (such as a 3D map) of the pool structure which assists the pool cleaning robot to recognize slopes, angles and thereby plan better the cleaning trajectory.

The 3D representation of the pool may include information about angles of walls, contact between floor and walls, an angled slope of a bottom of the pool.

During the generation of the 3D representation of the pool, when the pool cleaning robot does not fully recognize one or more pool static elements that appear in the field of view of the pool cleaning robot (for example—an image of a sidewall is not clear enough) then the pool cleaning robot may turn and acquire a 3D information about static pool elements located at the opposite direction—and may imposed the latter on onto the other (merged) to create a better map. The one direction versus the other is decided by an accelerometer pointing the slope direction.

The vision system may be operational both during the daytime and particularly during nighttime when substantial amounts of end users employ their pool cleaning robots to clean their swimming pools.

The photographing by the vision system may include photographing and memorizing views of every location visited in the pool.

The vision system may include at least one underwater camera.

The vision system may include a set of at least two cameras that may form a stereoscopic vision system that is able to capture and memorize three-dimensional (3D) photographs of the pool environment and every location visited in the pool.

The vision system may include a set of at least two cameras that may form a stereoscopic vision system and at least one additional separate camera that will be further discussed below but as an example, as an additional attachment camera onto at least one pool cleaning robot cable in a SET OF POOL CLEANING ROBOTS operating in a pool with the function of a non-entanglement of cables measure (see U.S. patent application Ser. Nos. 15/702,772, 15/702,77 and 15/702,774).

The vision system may be attached to a measurement unit that measures the rate or speed of the advance and movements of the pool cleaning robot.

The pool cleaning robot may use the memorized advance and movements profiles in a pool during a specific cycle time and compares them to nominal or standard profiles of advance and movements.

The pool cleaning robot employs for these purposes the stereoscopic vision system that is connected to the measurement unit. For example, the cameras may capture and memorize a photography of the location of the pool cleaning robot by recognizing a ladder pool light, drain, return jet or stairs that may be positioned near a vertical wall surface thereby pinpointing its position location in the pool.

The pool cleaning robot may recognize the precise entry point to start a vertical wall climbing procedure until it reaches the water line. At the water line the pool cleaning robot may move sideways while cleaning the waterline for a certain period of time. The stereoscopic vision system may capture and visualize points during the trajectory of the pool cleaning robot at the water line, including its descent from the wall and its point of return to the horizontal floor, thereby processing the speed/rate of movement or the drifting from pre-planned trajectory or path parameters and perform corrective actions.

The accurate positioning of the pool cleaning robot may enable to cover only (or substantially) only regions of the pool to be cleaned while reducing (and even minimizing) movements and/or cleaning by pool cleaning robot of other regions. This increases the efficiency of the cleaning process, reduces the time of cleaning, and saves energy.

The accurate monitoring of the location of the pool cleaning robot provides accurate information about the speed of propagation of the pool cleaning robot. If, for example, the accurate monitoring detects that the pool cleaning robot moves too fast (above the speed mandated by the rotation of wheels or tracks) then it is an indication that the pool cleaning robot is slipping. The slipping mat indicate of slippery regions—resulting from the accumulation of algae. This may require alarming a pool cleaning robot user, changing the cleaning process, avoiding the slippery region, and the like.

Corrective actions (in case of finding problems or deviation from desired propagation path, speed, and the like) may include increase or decrease drive motor(s) RPM in order to increase or decrease movement speeds. It may similarly, increase/decrease water jet thrusting power (side, rear, top or bottom jets) in order to further regulate movements of the pool cleaning robot and eliminate any drifting from pre-planned trajectory or path parameters and perform corrective actions.

Yet for another example, the pool cleaning robot may similarly recognize the precise entry point to start a substantially inclined pool surface ascent or descent on such an inclined surface that may exist between the deep and the shallow areas of the pool.

Likewise, the pool cleaning robot may recognize location of existing plumbing fixtures or installations of the pool such as: main drain, return jets and the like as described in U.S. Pat. No. 8,665,858 that is incorporated herein in its entirety.

The pool cleaning robot may, by means of its vision system, recognize a pool docking station, a pool cleaning robot battery charging fixture, and pool cleaning robot autonomous exiting structure as those described in U.S. patent application Ser. No. 14/501,098 dated 30 Sep. 2014 that is entitled: Autonomous pool cleaning robot and that is incorporated herein in its entirety.

The pool cleaning robot may, by means of its vision system, recognize another pool cleaning robot of a set of pool cleaning robots all operating in one single pool or any component or sub component, such as a tethered cable of the pool cleaning robot, such as described in U.S. patent application Ser. No. 15/702,772 filed on 13 of September 2017 and is entitled: A set of pool cleaning robots and that is incorporated herein in its entirety.

The at least two cameras that may form a stereoscopic vision system may include (or may be coupled to) a synchronism mechanism that synchronizes both stereoscopic cameras.

The synchronism mechanism may include a synchronizing hardware device that produces two equal photos that may cancel out and eliminate any uneven photos The vision system may further include at least one lighting system to provide one or more lighting beams to brighten partially or fully dark pool area environments so that the photographs may be captured while the photographed subjects are sufficiently illuminated.

It is crucial to obtain visual information about the pool surroundings to be able to navigate, maneuver and avoid obstacles. There is a need for high contrast and in the vision in various types of water quality levels that may include salinities, turbidity and the like.

The at least one lighting system may include a set that may include at least one LED system that may include of at least one LED lamp and at least one laser beam emitter.

The at least one set stereoscopic cameras, the at least one set of LED and laser that may be connected to an integrated vision PCB platform that may also include a photographic computerized processor, an RGB LED and the like that are described in further detail below.

The at least one set stereoscopic cameras may employ one camera out of the at least one set in order to capture regular two-dimensional photographic captures.

The at least one set of LED may be connected to an integrated vision PCB platform that may also include a photographic computerized processor, RGB LED and the like that are described in further detail below.

The entire integrated vision PCB system may be packaged inside a water tight, waterproof casing that comprises a transparent cover or visor.

The transparent cover may comprise a mechanism whereby different or additional transparent covers may be installed at OEM or end user level. For example, tinted covers able to filter out certain lighting wavelengths. A yellow tinted additional cover may be clipped-on in order to compensate, for example, a too harsh blue ambient environmental backlighting.

The RGB LED may control multiple colored lightings such as green, blue, red and additional lighting color combinations.

Alternatively or additionally, the RGB LED may include of an array of LED system where each LED may include different colored LED light bulbs.

The at least one LED may emit a white colored beam for general-purpose lighting of pool areas that need to be photographed for pool cleaning robot navigational purposes. In ideal conditions, this may be the most commonly used type light beam illumination both at day, twilights and at night.

The at least one LED may emit a strongly attenuated red colored beam for the sensing by the stereoscopic camera vision system of the overall environmental lighting conditions in the pool and to assist with the emitting intensity and strengths of the other LED (or laser) so that the photo colors or contrast may be optimized in the pool cleaning robot photo capturing for navigation.

Another use of colored LED may not be just for navigational or recognition of pool structures but also for underwater remote controlled recreational snapshots such as described in US patent application U.S. Ser. No. 15/415,892 dated 26 Jan. 2017 and entitled: Interactive pool cleaning robot "whereby, the cameras or a single camera installed onto the pool cleaning robot are waterproof.

Controlled photographic capturing may concern stills snapshot photos or video clips that their capturing (start and end) may be controlled by a remote-controlled device such as a tablet or another smart wireless device using a dedicated application, for example MyDolphin® downloadable application.

Because good quality, high-resolution photographic stills or videos may occupy large amounts of data space in any memory device, in the pool cleaning robot control memory, the system facilitates the uploading of such data to the internet or cloud.

The vision system may therefore further comprise additional interface hardware with such as a Wi-Fi® or Li-Fi component devices that may communicate with internet.

Wi-Fi® technology that, it is well known, cannot function underwater so as soon as the pool-cleaning robot is removed or taken out from the swimming pool the captured photographic data may be transmitted thereafter.

Another embodiment of the uploading of photographic data may employ a Li-Fi device (Light Fidelity) that, it is well known, is able to employ wireless communications underwater between devices using light to transmit data whereby, light travels relatively well in short distances such as in a swimming pool where radio transmission waves such as Wi-Fi® will not function. From the pool cleaning robot further communications are possible to and with an external to the pool device such as a power supply—especially where there exists a line of sight—that is able to receive, convert and process data light signals into digital formats. The device may then upload the data while underwater without the necessity to delay upload until the cleaner was removed from the pool.

The at least one LED may emit a low attenuation blue or a white colored beam for improving lighting conditions of underwater photography of objects or subjects especially in the deep end of a pool or if natural daylight conditions are not optimal.

Further, if the objects or subjects of the photographic captures are illuminated by blue or a white light LED, better visual photographic captures will be achieved, with less haze or dispersion. However, the reflected light may need to be controlled and this will be achieved by either a dimming effect or by controlling the RGB to compensate a bright light with, for example, yellow or other warm color lighting or by employing the LED as a flash light or strobe.

The at least one LED may emit a lower attenuation green colored beam for overcoming cloudy or underwater turbid conditions caused by unsettled and floating dust particles or solids, biological matter and the like that may attenuate light in the white or blue wave lengths. A green colored beam may penetrate deeper to neutralize a blurred background caused by a milky mist or cloudy water.

In order to measure and to counter turbid underwater photographic visibility conditions, the pool cleaning robot may, at the end of each cycle, arrive at a final location that may be a preprogrammed fixed location, and by means of the at least one camera capture at least one photo of an opposite or a near pool wall or any other pool structure. This may be performed once a day, in full daylight, whereby the captured photo is saved in the robot memory. The pool cleaning robot may compare any new photo quality with an earlier one and by means of an algorithm interpret a drop in photographic quality as an increase in water turbidity. Such an increase in turbidity may automatically trigger the start of a new cleaning cycle.

The type and the choice of colored beam used may also be a function of the background color captured by the camera(s). In order to improve the contrasting of the photograph's object or subject, for example, a yellow colored beam or any other warmer color light beam, may neutralize the natural blue color background or the naturally occurring blue color that originates from commonly used blue colored swimming pool PVC or GRP coverings that give, for example, the "blue look" to many pools.

The choice between different colored light beams such white, green, blue, red, laser and the like, may be automatic and subject to quality of real time processed photographic views' qualities such as sharpness, contrasts and color that may automatically initiate a lighting procedure, which may be able to constantly improve the captured views. Such a lighting procedure may be initiated any time but especially at a trial and error process of measuring for optimal photographic capturing results.

Strong uncontrolled light reflection, reflective backlights or flickering may also hinder photographic quality by the camera thereby impeding ability to clearly recognize pool fixtures or structures for optimal vision system operation and navigation.

Naturally occurring vibrating or quivering lights and shades are effects where the constant reflections and flickering lights and shades impede the qualities of photographic capturing. This may particularly occur during daytime, when wind blows on the water surface of the pool causing ripples but also during nighttime where the same phenomenon may occur, for example, when the pool spot lamps are lit.

The vision system may further be configured to filter the said reflections. The reflections or flickering may change randomly according to time of day and pool location. The mechanism employs the keeping in memory of last camera views captured over the last few frames in a specific location (few frames may be 1, 2, 3, . . . n frames). Further, when the camera begins capturing a flickering or unsettled lighting events comprising shifting and moving views the pool cleaning robot begins to process the captured frames by merging the said memorized frames with the presently captured frames and thereby eliminating the flickering factor from the photo. be equal in both stereoscopically captured photos simultaneously acquired by both the cameras so that the filtering function may cancel out and eliminate both reflections evenly.

The at least one lighting system may include at least one laser beam emitter that may be used for ornamental purposes, providing an entertaining light show in the pool and may also be used as photographic capturing tool.

The ornamental laser show beam may be used for camera recognition. Namely, the constantly moving light on the pool surfaces that are moving on the pool surfaces may be captured by the camera(s) and used as additional navigation means.

The at least one LED may further employ, within the framework of the pool cleaning robot control system, its integrated vision PCB platform of the vision system, at least one dedicated dimmer device that may be employed to increase or decrease any color lighting beam strength according to existing ambient underwater lighting and captured photographic colors conditions. For example, at night or when there exists a flickering phenomenon comprising of vibrating or quivering lights and shades on the surfaces of the pool.

An increase in lighting emitting, especially for color compensations or improvements, may employ the at least one LED as the flash light or strobe.

The at least one LED may include the dimmer element that may be employed to automatically decrease lighting beam strength when adverse ambient underwater lighting conditions exist or when strong back lighting is being reflected back from photographed pool surfaces for example, when facing a strongly lit nearby vertical wall or reflections from, for example, capture of stills or video of persons or facials underwater. The dimmer provides better picture quality under adverse effects.

The dimmer element may be employed to automatically decrease lighting beam strength when adverse ambient underwater lighting conditions exist for example when strong lighting is being reflected back from cloudy, milky or turbid water caused by unsettled and floating dust particles thereby acting as a motor vehicle "fog lights".

The dimming mechanism may be connected to a separate photo-resistor light power sensor that may be integrated onto the vision PCB platform. Such a resistor modifies its resistance as a function of the light beam that hits it. Such a resistor may be a model PDV-P8201 available from Luna Optoelectronics from Roanoke, Va., in the US.

The dimming mechanism may be an inherent diode that forms part of an ordinary LED thereby saving the use of a separate, additional, light power or intensity sensor.

The inherent dimming mechanism may employ a photo-diode light power sensor that may be integrated in an ordinary LED thereby recognizing environmental light or darkness intensities. Such a diode may be a model MTD5052 W available from Marktech Optoelectronics from Latham, N.Y. in the US.

The photo-diode converts photons to electrical current whereby every p-n junction diode may embody such a photo-diode that by being transparent is able to recognize light or darkness intensities and also act as a light emitter.

Underwater camera visibility conditions (penetration ability) and turbidity level conditions (penetration disability) in the underwater swimming pool water environment, or back-light reflection from elements like pool surfaces such as walls or waterline, may be measured by transmitting lighting beams towards the water or onto said pool surface by employing various and different light colored interchangeable beams. Such as, but not exclusively, white/blue/red/ yellow/green or any other color combination that may be set by the said RGB and that are transmitted by the said LED. The need for interchangeable and a variety of lighting beam options is motivated by a combination of environmental factors that are common in underwater photography, especially botanical or archaeological. There are changing variables underwater that are related to the external natural or unnatural light intensities, pool covering colors provide different background tints or shadings to the environment, depth of the swimming pool, the water clarity and the like. There is a need in measuring the reflection (backlight) or the penetration level of each of the light colors using a light sensor or camera and comparing the reflection intensity level between each color. For example, a white beam color is transmitted by the LED and the returned intensity of the reflection percentage factor is measured. After that a blue beam, followed by a green and red then yellow or any other combination that may be set by the RGB and that are transmitted by the LED and each reflection level is being measured. During one cleaning cycle of the pool cleaning robot, in different areas of the swimming pool, different colored beams may be used according to the circumstances. A calculation and comparing of all the reflection value results may provide an index the reflection that may be translated into a turbidity level and eventually decide whether the camera is able to continue functioning in an optimal mode.

It is important to understand that although this specification concerns itself with navigation of the pool cleaning robot underwater it is equally so with regard to underwater photo and video capturing. In practice, the same technological requirements, rules and solutions proposed, apply to automatic camera navigation, that are implemented without human intervention, as what might apply to private leisure photo and video capturing that may require some measure of manual activation, at least when it concerns pressing the camera or video activation button in a remote computerized or smart device.

The pool cleaning robot may be configured to collect and plot a graphical view of a swimming pool including the "constituents" (walls, ladders, spot lamps, stairs, jets). The data will be stored in the pool cleaning robot. The said data may be further uploaded to the cloud for OEM analysis of pool cleaning robot performance. A waiver of privacy may be needed for this.

Based on the data on the pool, a recommendation report may be sent to the end user with advices how to improve pool cleaning robot behaviour in his pool.

In another embodiment, the pool cleaning robot does not include nor employs an vision system with the above mentioned dedicated at least one LED but includes, for example, an ornamental lighting lamp that may be a LED that comprises a photo-diode light power sensor that may be used to control the intensity of light emitting from the ornamental lamp or LED.

Alternatively or additionally, a dedicated backlight sensor may be attached to the integrated vision PCB.

The integrated vison PCB may include of a flat base structure that comprises the electronic components such as but not exclusively, the camera(s), lighting devices, sensors, sealed cover and the like attached to the flat base.

In another embodiment, the PCB base may not be flat but may be arched/curved or cambered.

The flat, arched or cambered forms of the base PCB has an effect on the architecture of the positioning of the at least one camera or cameras and the LED. Namely, the baseline of the cameras may be narrow or may be wider in practically endless dimensional configurations or combinations. The wider (lengthwise) the baseline—so it is easier to form triangulations and measure distances to pool structures.

In the preferred embodiment, the PCB may include a 12 cm (or other size) baseline for the cameras from which a depth of 40 cm. may be extracted whereby the distance from the camera up to 40 cm. is a "dead zone" that cannot be photographed.

The more the distance between both cameras is wider, the smaller is the dead zone distance between the pool cleaning robot body and so is the effective capturing distance thereby reducing the ability to identify pool features, obstacles or elements.

What defines the dead zone is the viewing angle of the camera that is a function of the physical size of the camera's image sensor size and the focal length of the lens and the gap between them.

There may be provided a smaller gap by means of using, in the context of the stereoscopic vision system of two cameras, one narrow lens camera (regular) and another wide lens camera. The resolution of the wide lens camera may be then increased to adapt it to the triangulation ability of the narrower lens.

The estimated distance with the 14 cm baseline should be 50 cm but may still be sufficient to acquire good photographic views.

In order to achieve a synchronized stereoscopic 3D camera view, at least one pair of cameras is needed.

The pair of cameras may be installed on the baseline of any reasonable width.

Additional cameras may be used thereby increasing the baseline width to be used in wide bodies pool cleaning robot s. 50-cm baselines may be achieved. The 3D views may also be achieved by viewing say, two or more sets of stereoscopic views created by two or more sets of cameras.

An additional at least one separate camera may be installed on the baseline. This additional camera may be a digital underwater SLR camera that may be fixed to the vision system or to the pool cleaning robot by wiring the camera onto the PCB platform and a digital onboard photo processor that may be used to capture the recreational pictures underwater.

The additional digital SLR camera underwater may be used as an add-on by an end user to capture the recreational pictures underwater whereby the camera may be a dismountable and removable camera.

The LED lighting fixtures may be positioned on the same flat or curved PCB baseline.

The LED lighting fixtures may be positioned off the flat or arched PCB baseline and be attached to the cameras by means of a braided wiring device.

The wiring braid may be particularly useful when the LED are used in conjunction of an arched PCB base.

Therefore, in another embodiment, the LED may be located in a non-compartmentalized fashion on the body of the pool cleaning robot. For example, two cameras in a centrally positioned location on the body with two LED positioned separately.

Nevertheless, usage of connecting the LED to the PCB by means of braided wiring devices may cause difficulties with maintaining stable calibrations over time.

The photographic capturing, recognition and memorizing of the entire environment of the pool and its elements may activate the steering element that may be configured to navigate the pool cleaning robot along a preprogrammed cleaning path or a manually remote controlled selected programmed paths.

The recognition of pool features mechanism may include the performing of an initial photographic testing and calibration procedure at the start of each cleaning cycle. Such a testing procedure may be the trial and error process of measuring environmental pool conditions for optimal results.

The environmental pool conditions may comprise any one of: overall ambient lighting conditions, slipperiness of surfaces and speed of pool cleaning robot propagation, angle of surface, triangulation of pool cleaning robot position and the like.

The testing may comprise a set of travelling maneuvers between walls and capturing their photographic relative positions using the vision system that may be assisted by the sensors.

The travelling test maneuvers may consist of circular 360 degrees movements on the pool bottom whereby the pool cleaning robot may horizontally also turn around its axis.

Triangular or angled test moves between opposing walls may also be possible

Free style test movements may also be possible.

The type of maneuvers may be combined or selected according to initial assessment by the main PCB control of the pool cleaning robot in conjunction with the integrated vision PCB of the type or shape of the pool and other sensors.

The type of testing maneuvers may be combined or selected according to initial assessment of, for example, the shape of the pool, the slipperiness level of the surface i.e. the drifting rates, the quality of photographic capturing, day or night cleaning cycles, the surface inclination levels, quality and speed of acquiring the pool cleaning robot triangulated position and the like.

The main PCB control may employ the integrated vision PCB as an integrated sensor device.

Figure 1B:
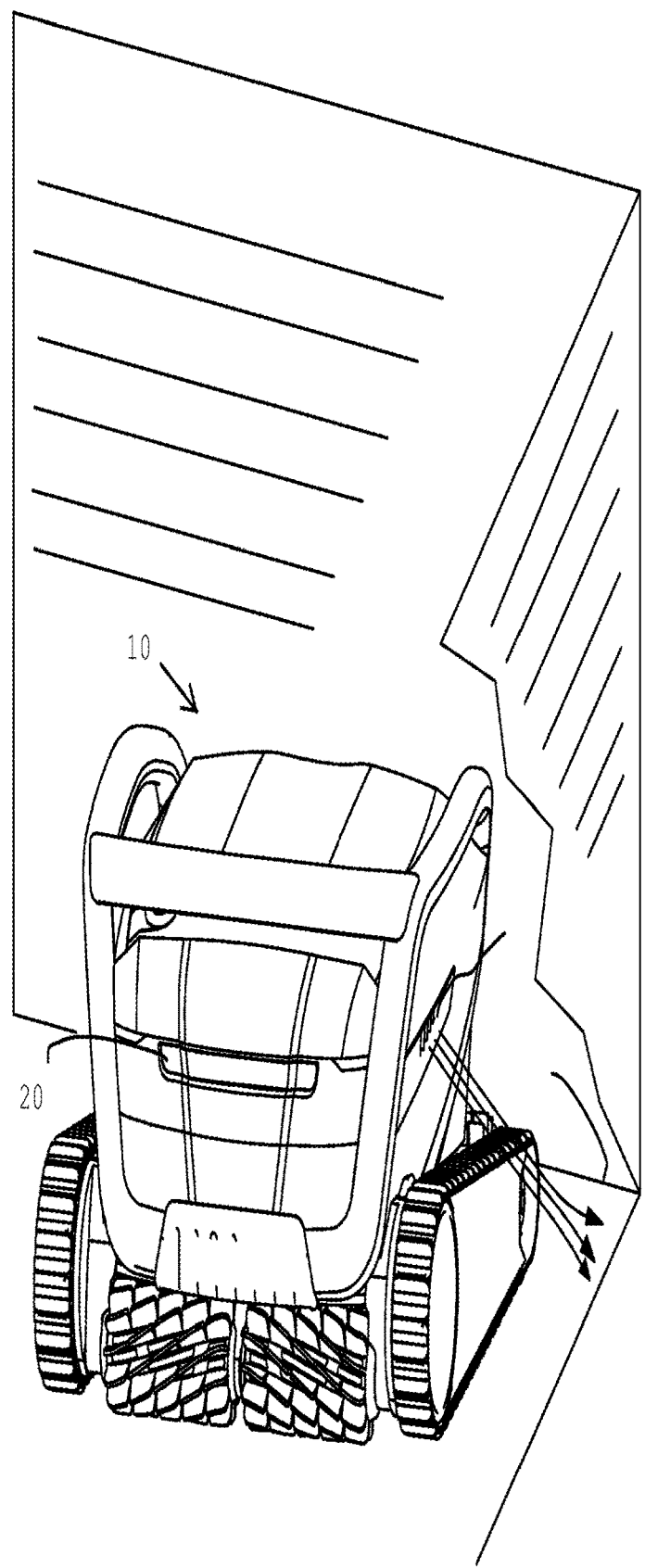
FIG. 1B is an example of a pool cleaning robot with a mapping and localization unit (vision system)

FIGS. 1A and 1B illustrate a pool cleaning robot 10 according to an embodiment of the invention. In FIGS. 1A and 1B the exterior of the vision system 20 is positioned at the front of the pool cleaning robot.

Figure 2:
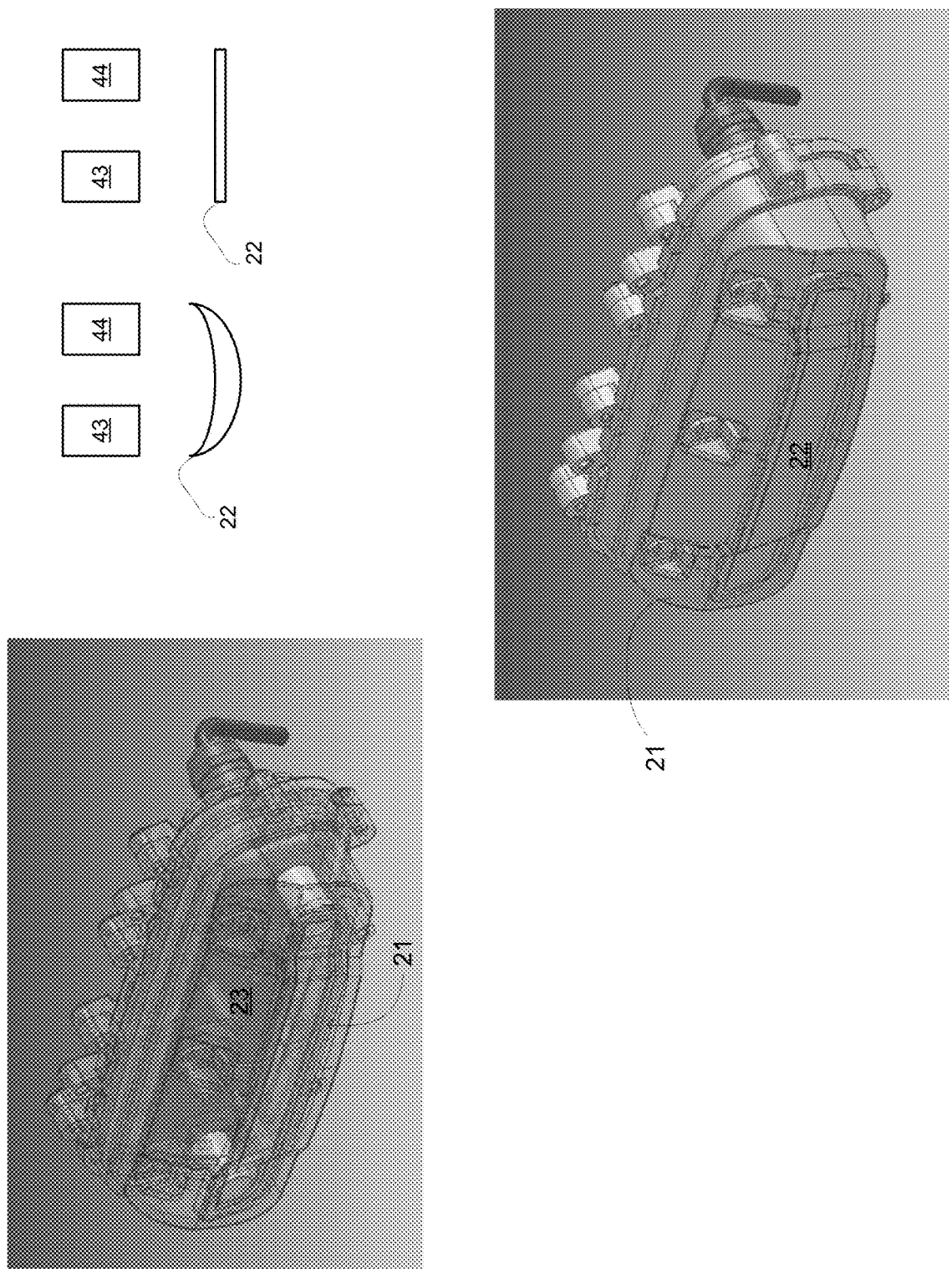
FIG. 2 is an example of a housing of the vision system.
Figure 2B:
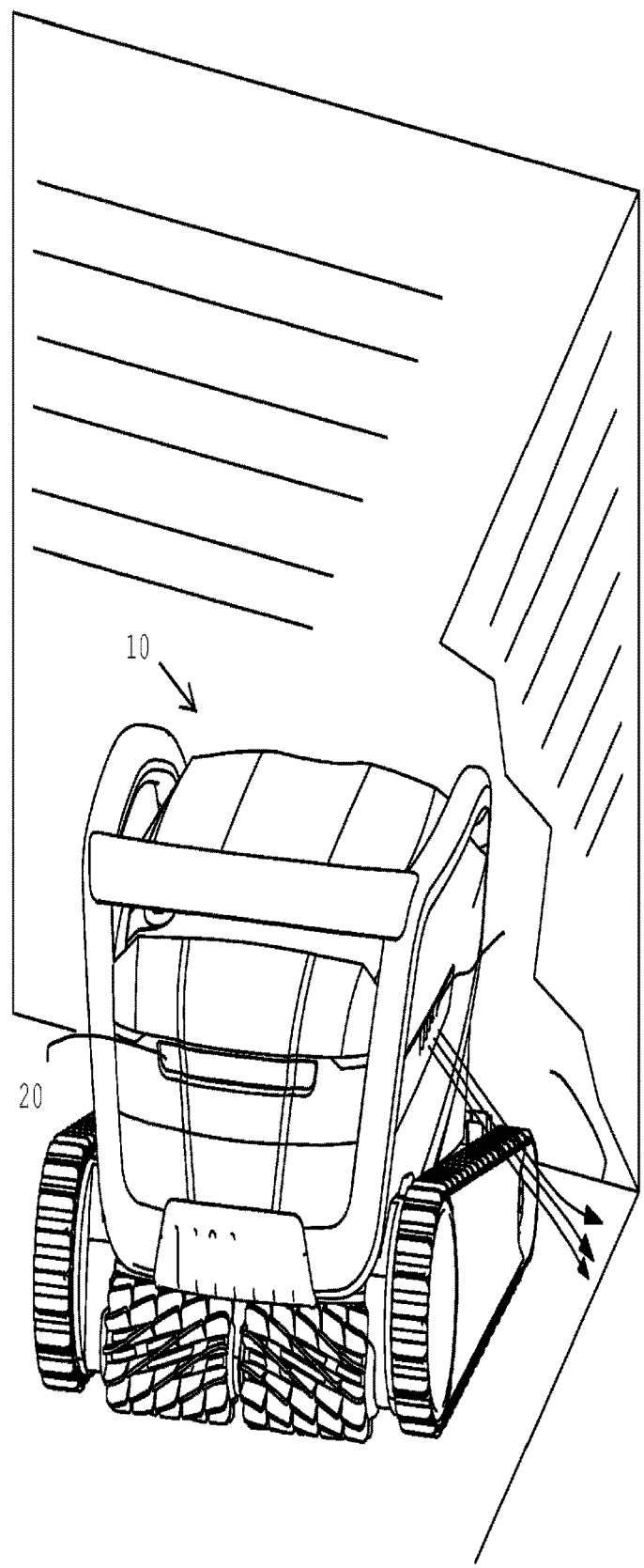

The vision system may positioned elsewhere (top, sidewall, rear, lower part and the like). FIG. 2 is an example of a housing 21 vision system—and illustrates the exterior of the vision system and also illustrates the location of a PCB 23 within the housing.

The housing include a flat transparent part 22 that is positioned in the optical path of the first lens 43 (of the first camera) and in the optical path of the second lens 44 (of the second camera). The flat transparent part may be replaced by a non-flat lens (see top middle part of FIG. 2).

Figure 3:
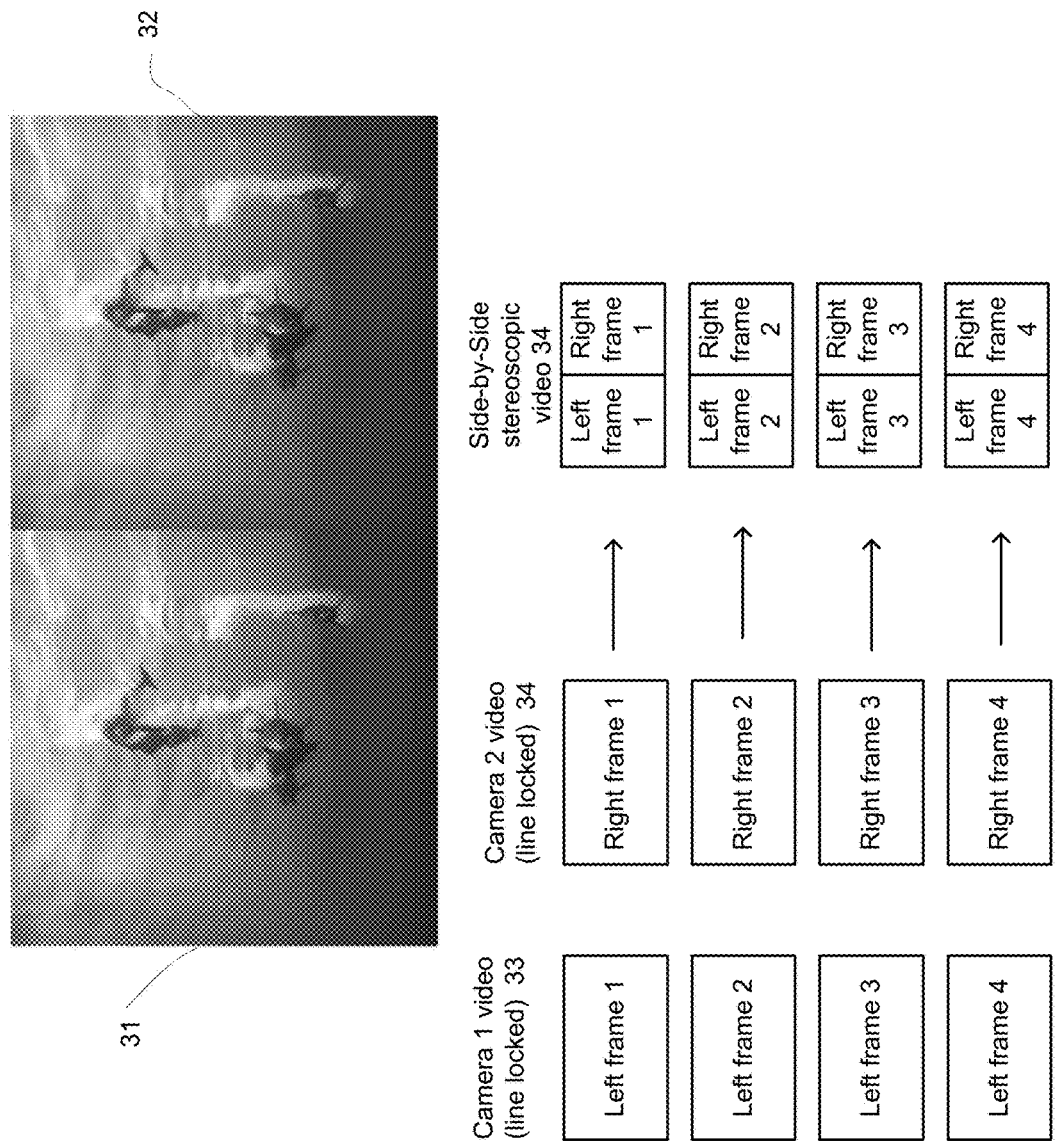
FIG. 3 is an example of images and image synchronization.
Figure 4:
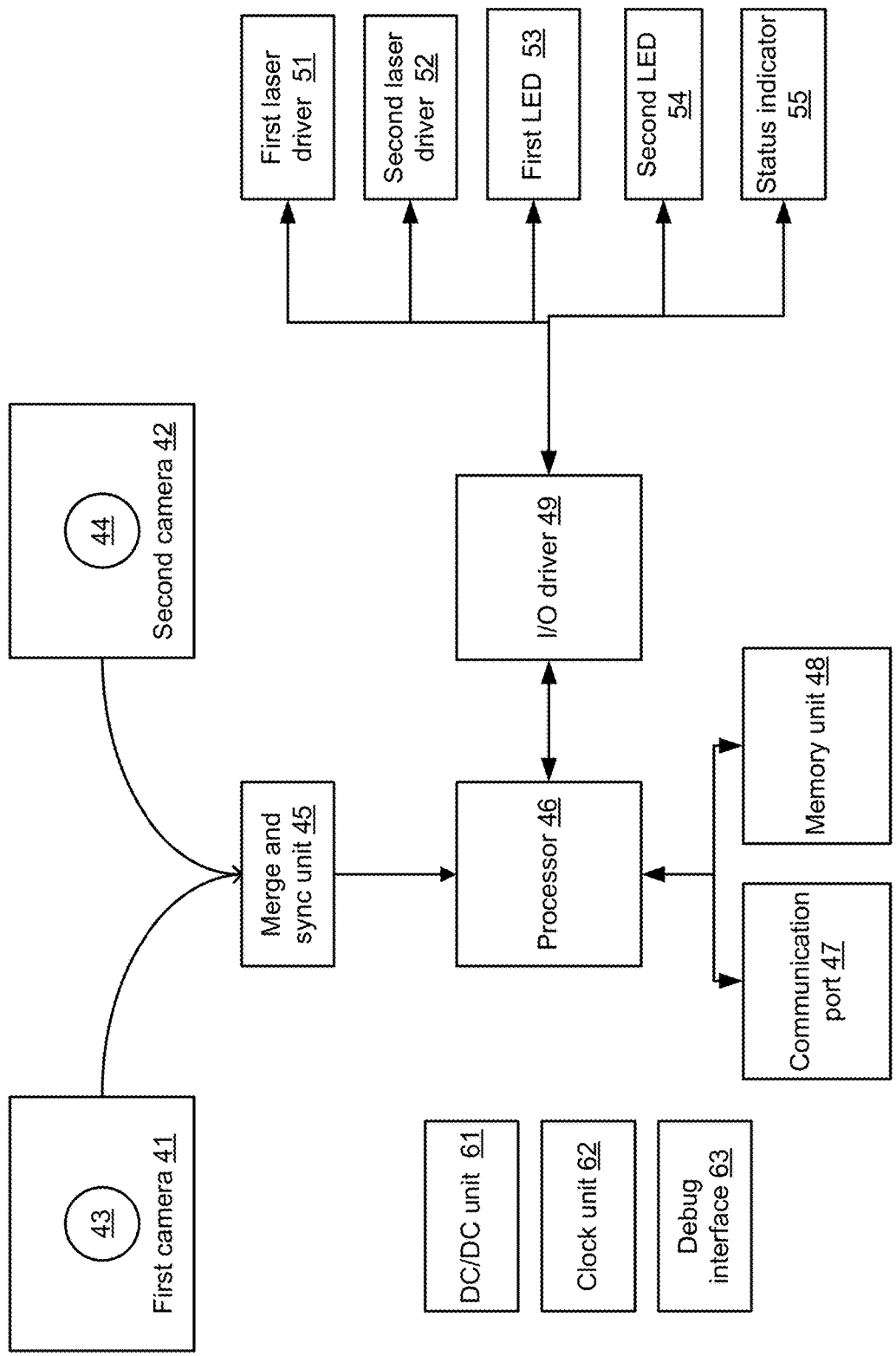
FIG. 4 is an example of an vision system.

FIG. 3 is an example of images 31 and 32 and image synchronization 34 (side-by-side stereoscopic video) based on first camera video 33 and second camera video 34 that are line locked—synchronized in line resolution. Slices (or lines) of images that are acquired simultaneously by two cameras are virtually positioned at the same slice of a side-by-side stereoscopic video.

FIGS. 4-8 illustrate examples of various components of the vision system 20 such as first camera 41, first lens 43 (of first camera), second camera 42, second lens 44 (of second camera), merge and sync unit 45 for merging and synchronizing between images from the first and second cameras, processor 46 for processing the images, communication port 47, memory unit 48, input output driver (I/O driver 49), first ornamental angled laser beam 51, second ornamental angled laser beam 52, first LED 53, second LED 54, status indicator 55, DC/DC unit 61 for supplying DC voltages to various components, clock unit 62, debut interface 63, first and/or second camera controller 71, first and/or second laser controller 72, RGB LED lamp 75 whereby the color value output and intensity of the light colors can be defined. For example, green ad red will provide the yellow light beam that is of importance in a blue colored swimming pool environment.

Figure 5:
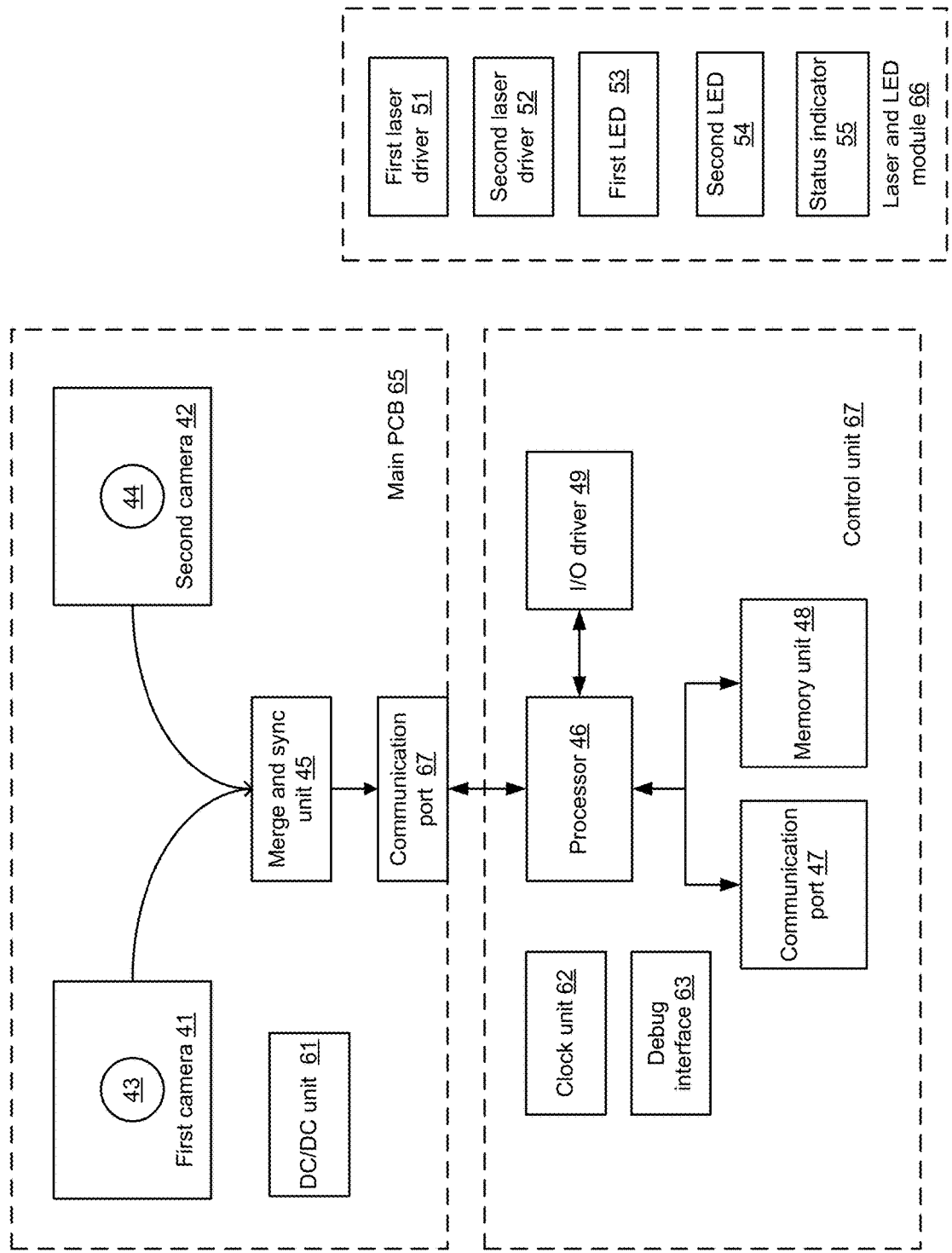
FIG. 5 is an example of an vision system.
Figure 6:
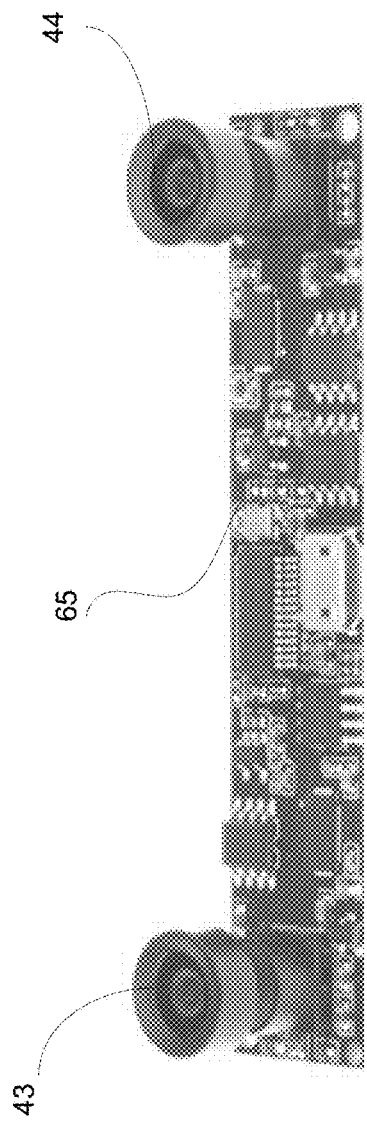
FIG. 6 is an example of components of the vision system.
Figure 7:
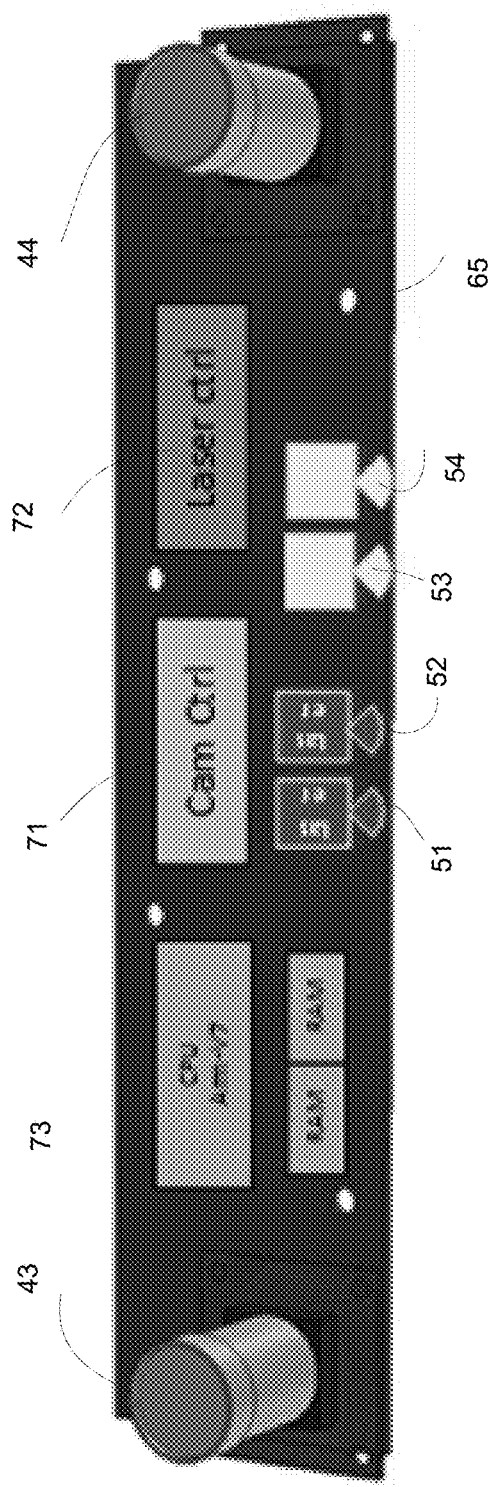
FIG. 7 is an example of components of the vision system.
Figure 8:
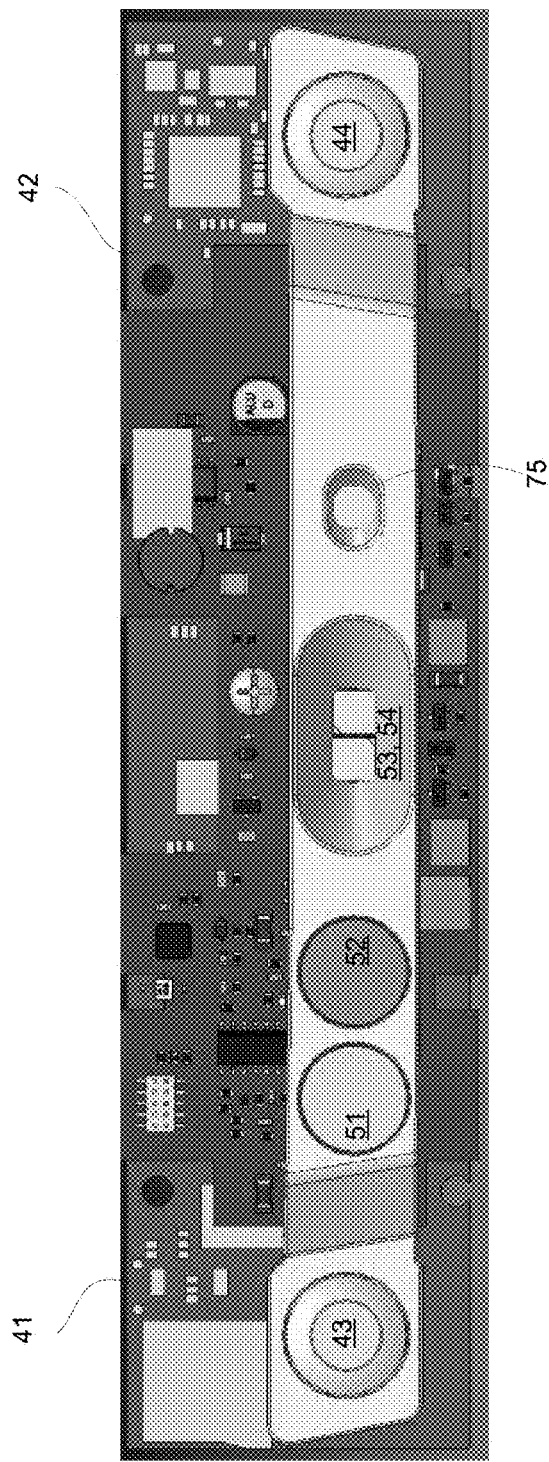
FIG. 8 is an example of components of the vision system.

FIG. 5 illustrates that first camera 41, second camera 42, merge and sync unit 45, communication port 67, and DC/DC unit 61 are located on main PCB 65.

FIG. 5 illustrates that first laser 51, second laser 52, first LED 53, second LED 54, and status indicator 55 are located at a laser and LED module 66.

FIG. 5 also illustrates that processor 46, communication port 47, memory unit 48, I/O driver 49, clock unit 62 and debut interface 63 are located at control unit 67.

Figure 9:
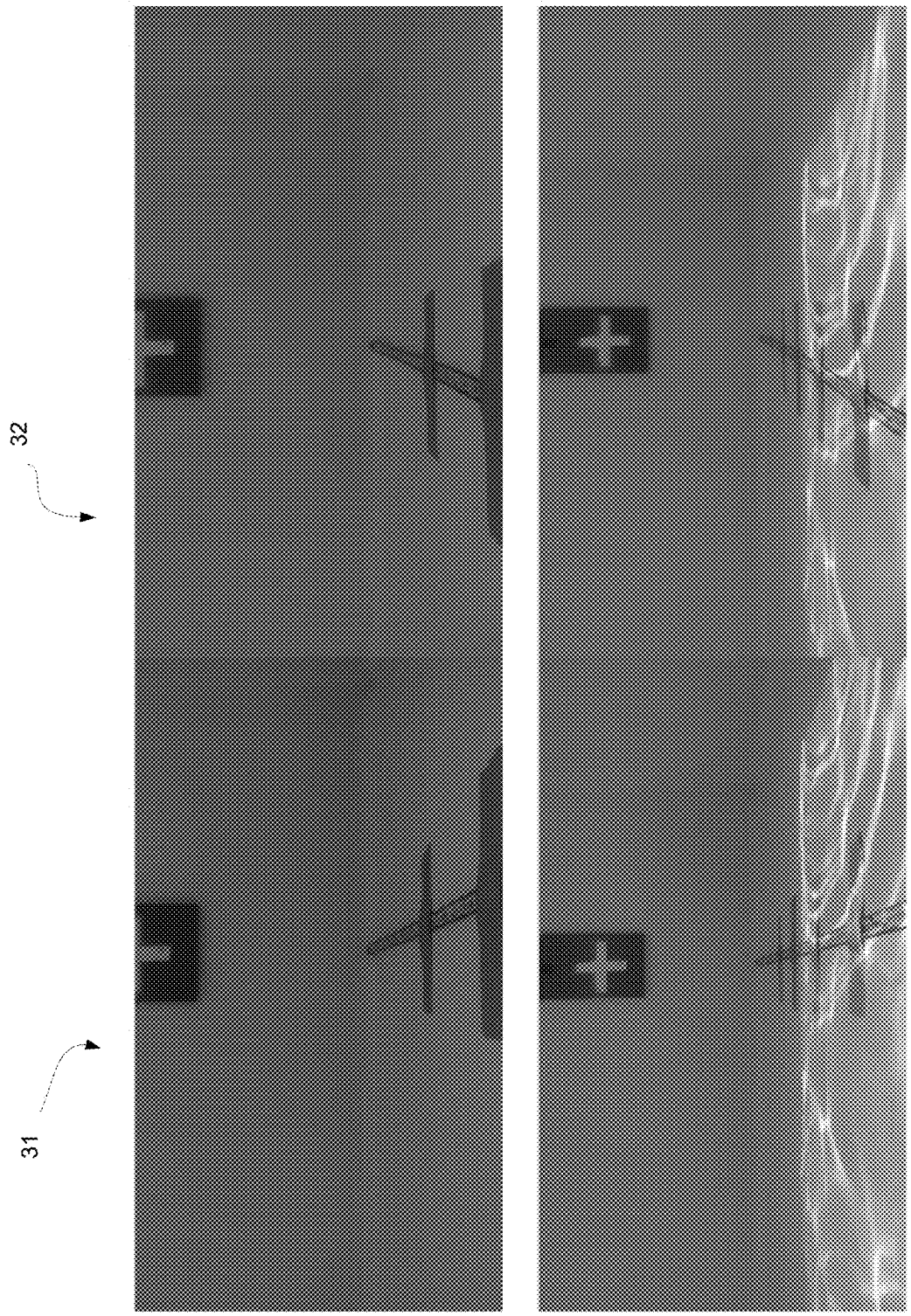
FIG. 9 is an example of 3D images captured underwater.

FIG. 9 illustrates images acquire by first camera (images 31) and images acquired by a second camera (images 32).

Image rectification may be achieved by using the said pool cleaning robot stereoscopic vision that captures two images imposed one on the other, by calculating the disparity of the images and by creating a depth cloud. This is the first step of creating a 3D image of the captured swimming pool landscape. The disparity is calculated pixel by pixel leading to a cloud of pixels, that is viewed by the human eye as a 3D picture of the landscape. In this specification, this means constructing a 3D model of the swimming pool area that is to be cleaned.

Consecutive matching scans (in the same pool) occurs, when a pool cleaning robot enters to the same pool repeatedly for example, every day. The pool cleaning robot quickly identifies the familiarity with that pool which is preceded by a short photographic viewing scan ("looking around") and by employing a preowned map that is stored in the memory of the pool cleaning robot control device. This feature reduces the time it takes to scan and map the entire pool before starting the actual new cleaning cycle.

The said vision system is capturing pictures from both cameras and by using the known method of triangulation between two cameras and objects at the front to create a 3D image also called a 3D cloud of the view ahead of the robot.

The said 3D cloud may be analyzed by employing a particle filter (PF) algorithm whereby the particles are the dots that combine to create the said 3D cloud.

This achieves a filtering the particles found in the cloud and removing the "noise" to find and to identify the actual features captured on camera. That activates memorizing and maintaining several assumptions concerning the real location of the wall or any other features or constituents located ahead of pool cleaning robot travelling path.

Figure 14:
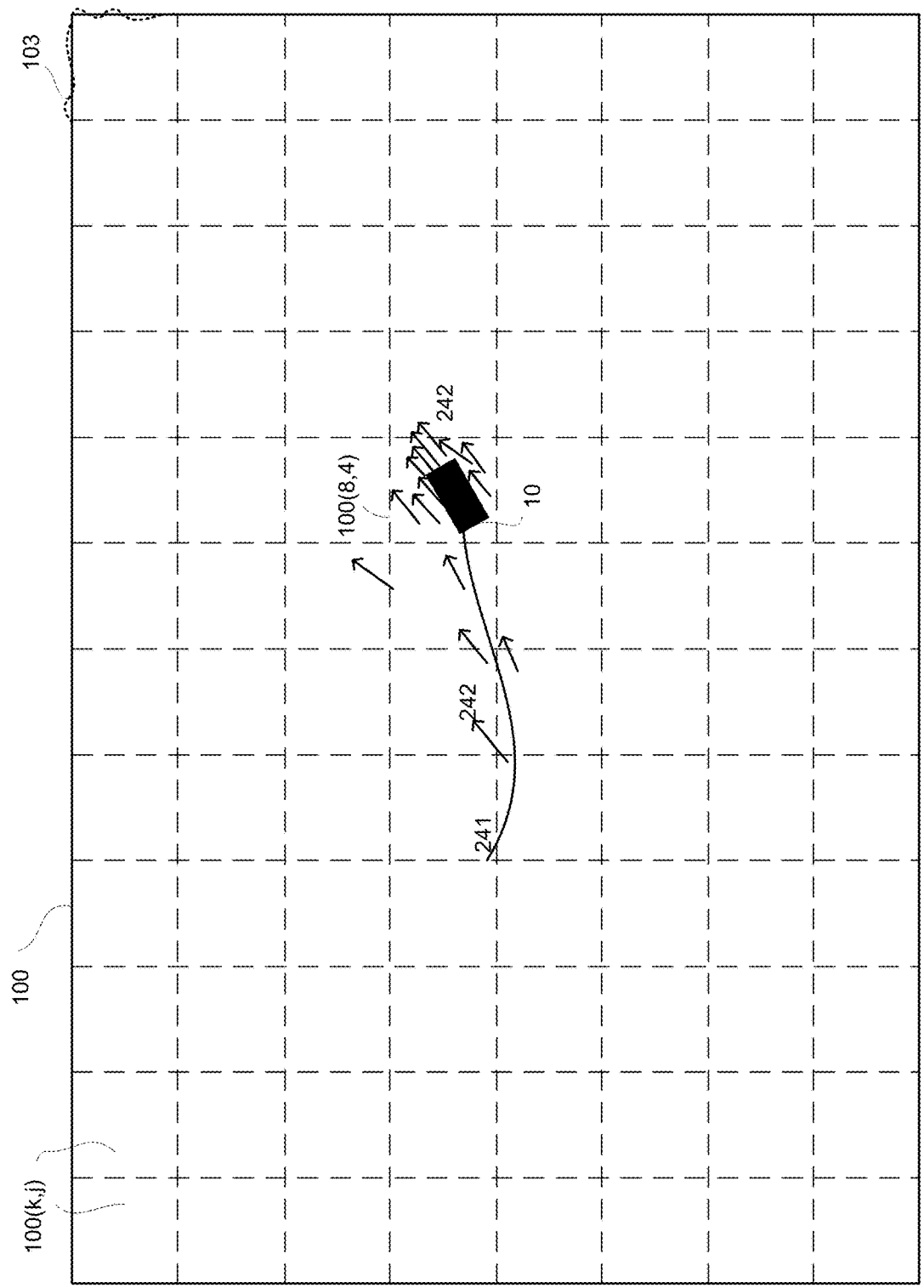
FIG. 14 is an example of a pool cleaning robot, a part of the pool and a cleaning region.

Furthermore, there exists an ongoing process of updating all the said assumptions in order to improve localization of the robot in the pool space. In FIG. 14 below, arrows 242 mark the possible location of the robot in the pool space. These possible locations are estimated by the pool cleaning robot 10 while moving along path 214. Statistically, the area (in FIG. 14—area 100(8,4) out of an array of areas 100(j,k)) with most arrows has the highest probability for the robot location. The collection of dots denoted 103 is a part of a 3D estimate of the pool—and in FIG. 14 this collection represents a corner of the pool.

The pool cleaning robot in the pool, while moving forward and backward while cleaning the pool and using the calculated systematic cleaning path.

Slam algorithm (PF based) builds a map online and using the same map for localizing the robot during the mapping session (building the map) and by comparing pool cleaning robot scan in the pool to the map and drawing it with probabilities. The pool map is divided into square coordinate cells. Each cell holds a probability of being occupied by the pool cleaning robot and each said particle in a map keeps several maps in memory at all times for a more stable map creation. That way, any bad or unsuccessful scans do not ruin the entire map for example, in the case of low visibility due to darkness or turbidity. Supports loop closure to correct backwards the drawing of the map based on similar locations mapped in 2D an algorithm to eliminate the sunlight sparkling or flickering on the pool surfaces. As discussed above, sun light or lighting sparkling may be caused by light breaking over the wave surface of the pool water. The stereoscopic algorithm allows a clear distinguishing between the lighting fluctuations and the real pool features.

Figure 10:
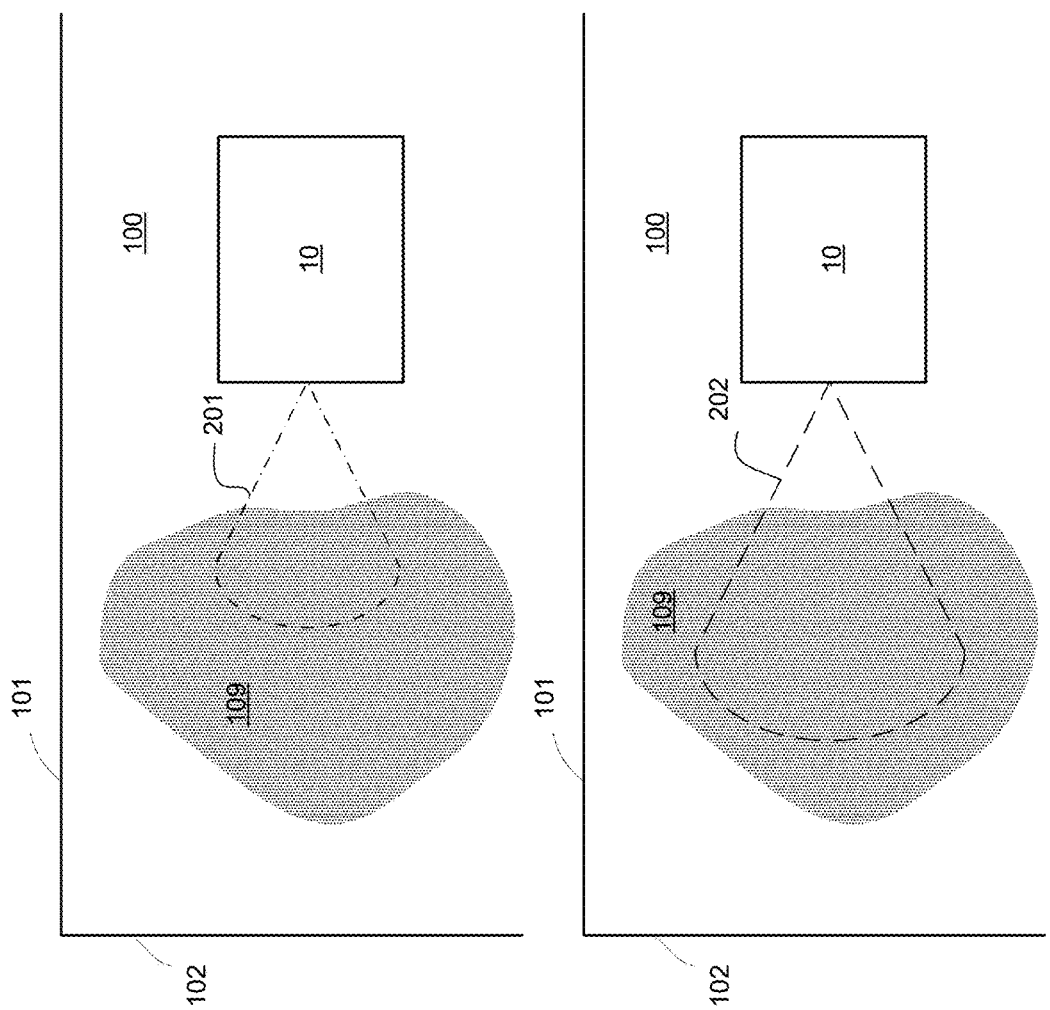
FIG. 10 is an example of a pool cleaning robot, a part of the pool and fields of view of the vision system.

FIG. 10 illustrates an example of a pool cleaning robot 10 in a pool 100 that includes first sidewall 101 and second sidewall 102. A volume of turbid fluid 109 is positioned between the pool cleaning robot 10 and second sidewall 102.

The pool cleaning robot 10 illuminates its surroundings with green light 202 and with a non-green light (other light) 201. The green light penetrates deeper in the turbid fluid 109.

Figure 11:
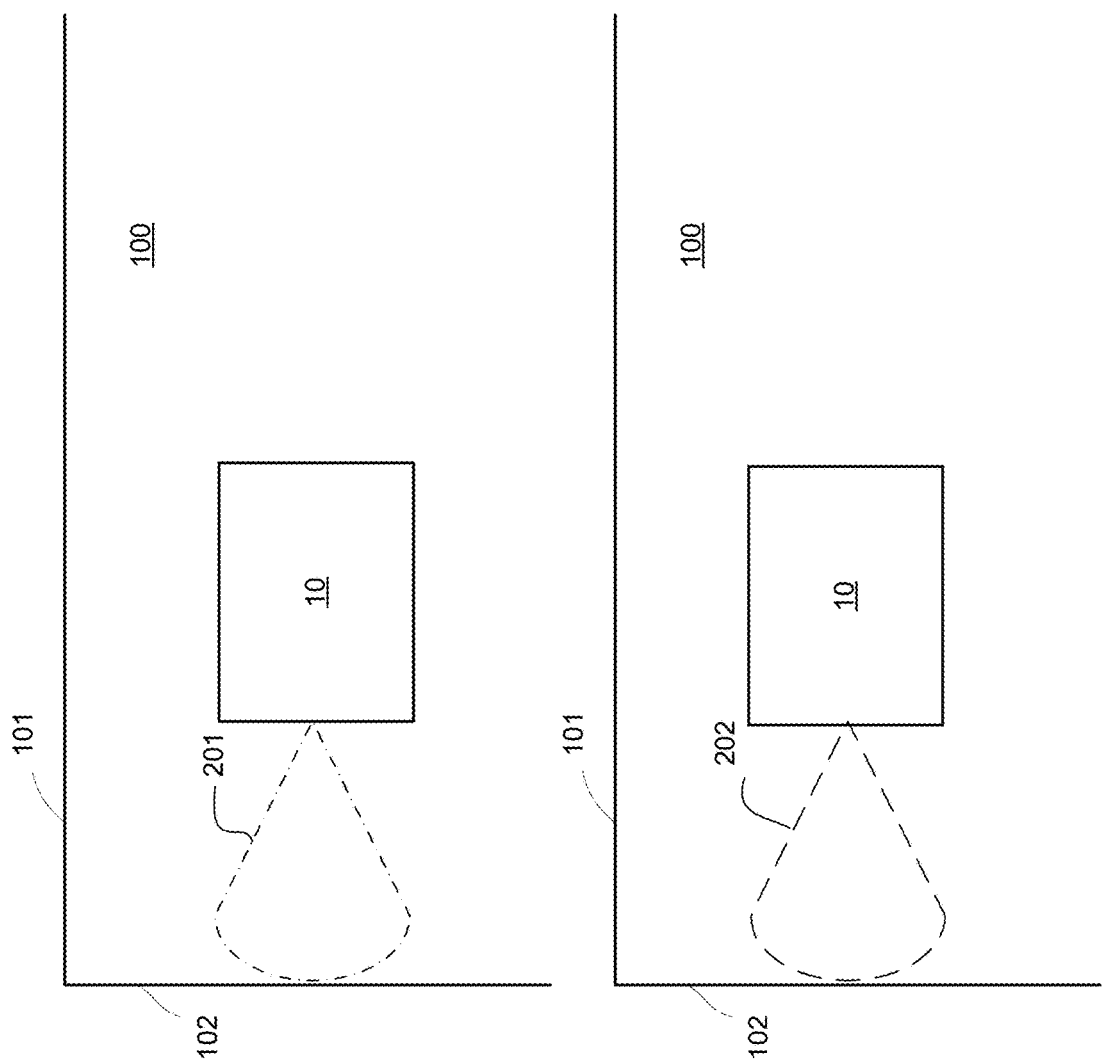
FIG. 11 is an example of a pool cleaning robot, a part of the pool and fields of view of the vision system.

FIG. 11 illustrates an example of a pool cleaning robot 10 in a pool 100 that includes first sidewall 101 and second sidewall 102. The pool cleaning robot 10 illuminates its surroundings (that does not include turbid fluid 109) with green light 202 and with a non-green light (other light) 201. The green light and the other light reach the wall- and thus enjoy a same penetration depth in the fluid of the pool.

Figure 12:
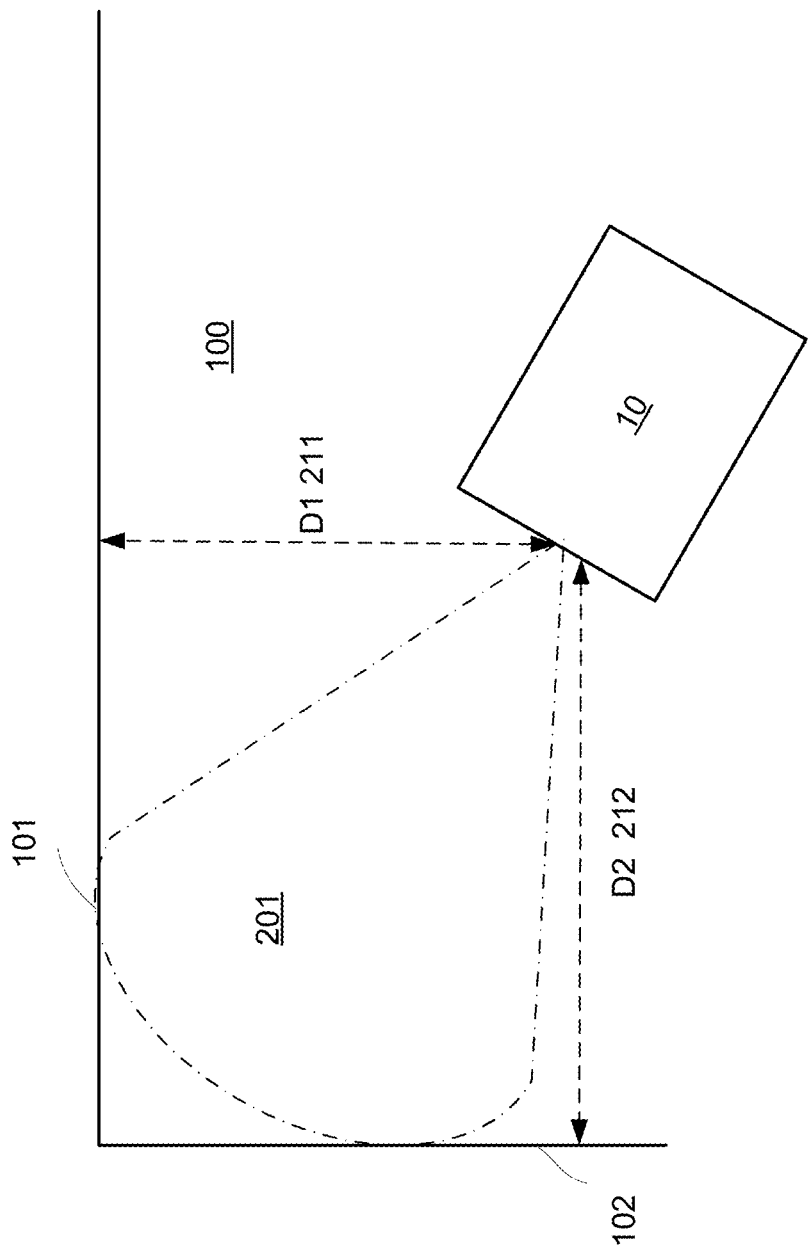
FIG. 12 is an example of a pool cleaning robot, a part of the pool and a field of view of the vision system.

FIG. 12 illustrates an example of a pool cleaning robot 10 in a pool 100 that includes first sidewall 101 and second sidewall 102. The pool cleaning robot 10 illuminates its surroundings—that includes parts of first and second sidewalls—thus allowing the pool cleaning robot 10 (using for example a stereoscopic camera) to estimate the distances (D1 211 and D2 212) from the sidewalls.

Figure 13:
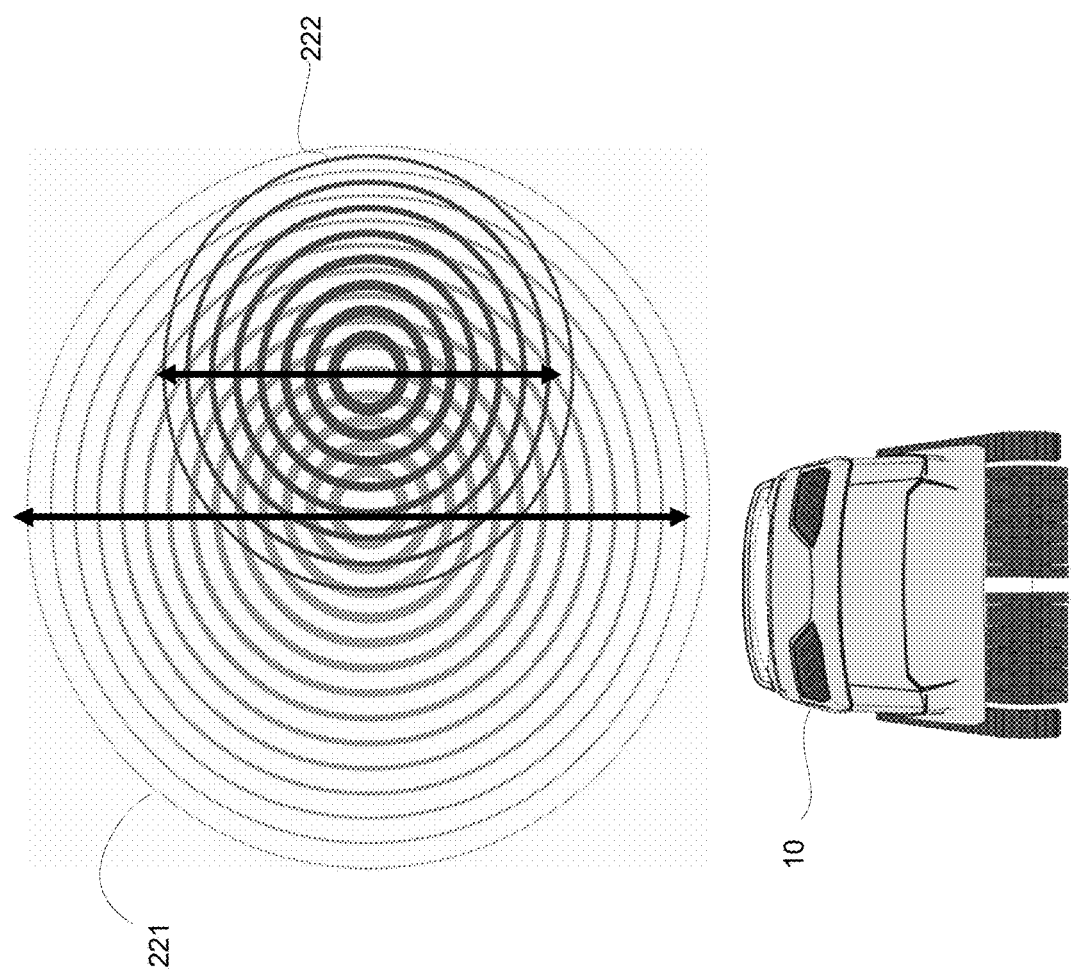
FIG. 13 is an example of a pool cleaning robot, a part of the pool an light cones.

FIG. 13 illustrates two light cones 221 and 222 generated on the surface of the water of the pool—as a result of illumination of the water by the first and second ornamental lasers.

Figure 15:
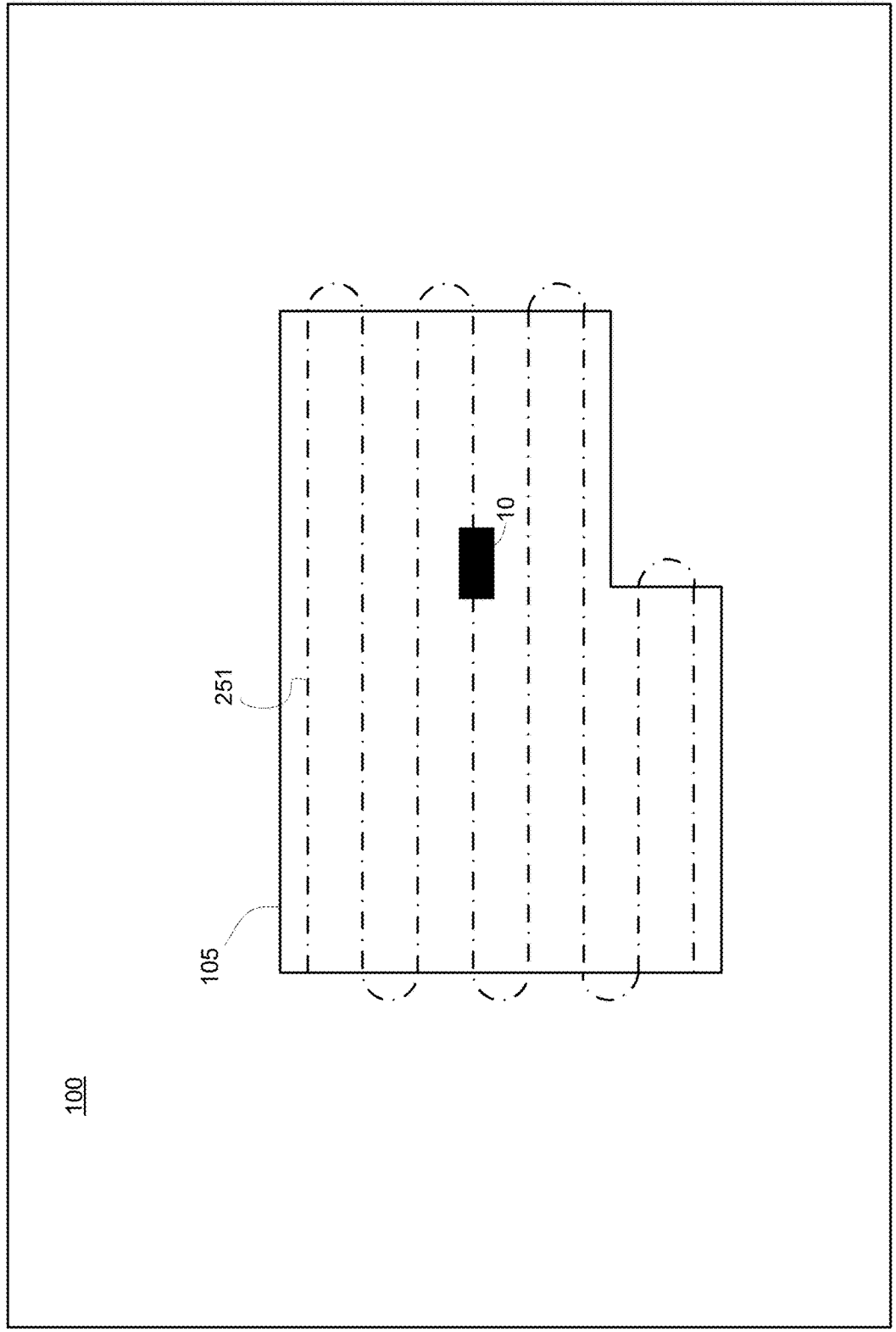
FIG. 15 is an example of a pool cleaning robot, a part of the pool and a cleaning region.

FIG. 15 illustrates a region 105 that is cleaned by the pool cleaning robot 10. It is noted that the region 105 may be of different shape, and/or of different size and/or may or may not include one or more portions of a sidewall of the pool.

Region 105 is cleaned while the pool cleaning robot 10 follows a cleaning path 251 that covers region 105 and extends slightly outside the region. The cleaning path is a raster scan cleaning path—but any other cleaning path (random, pseudo random and even deterministic path) may be used.

The pool cleaning robot 10 follows the path while repetitively determines it location in an accurate manner.

Figure 16:
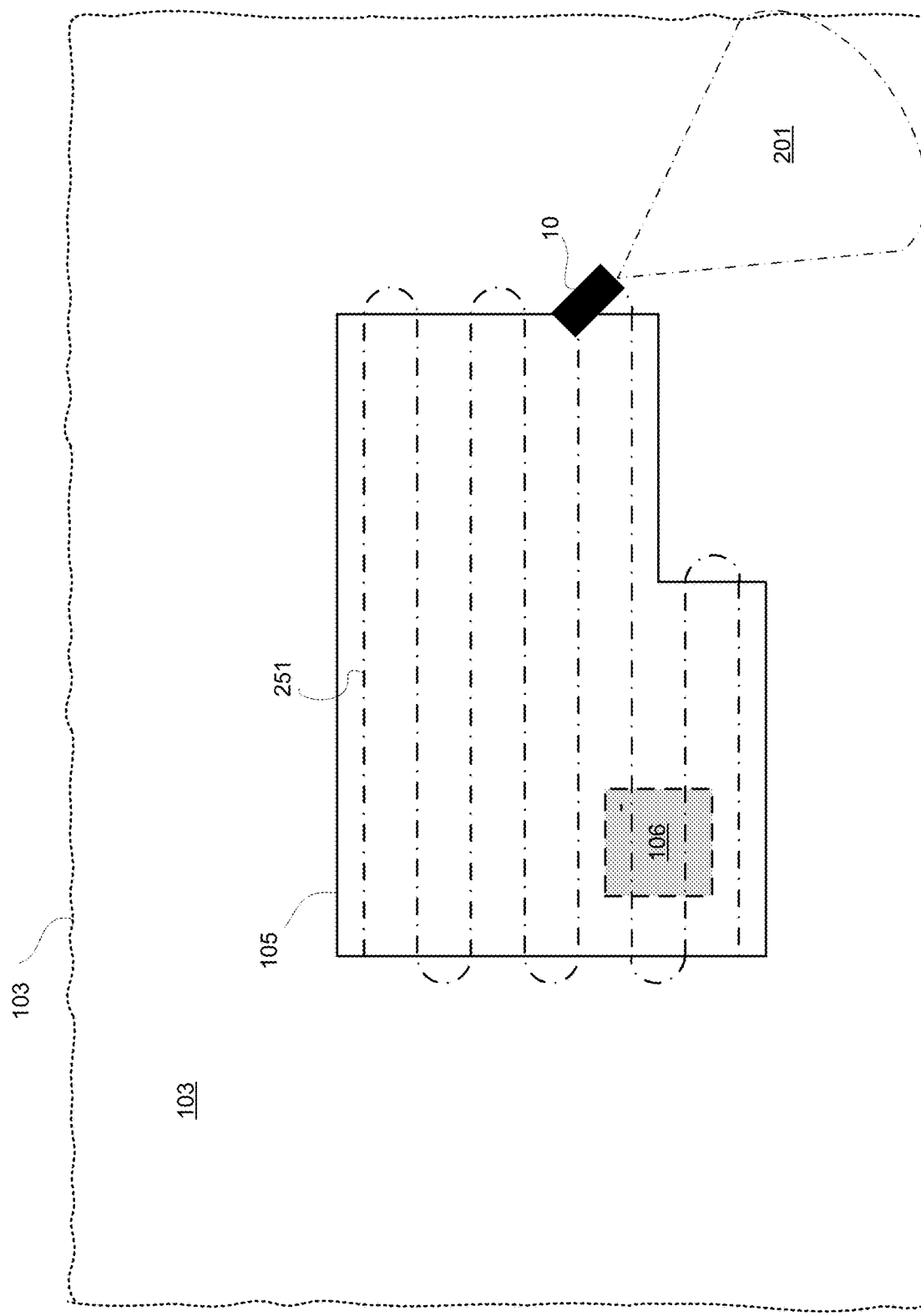
FIG. 16 is an example of a pool cleaning robot, a part of the pool and a cleaning region.
Figure 17:
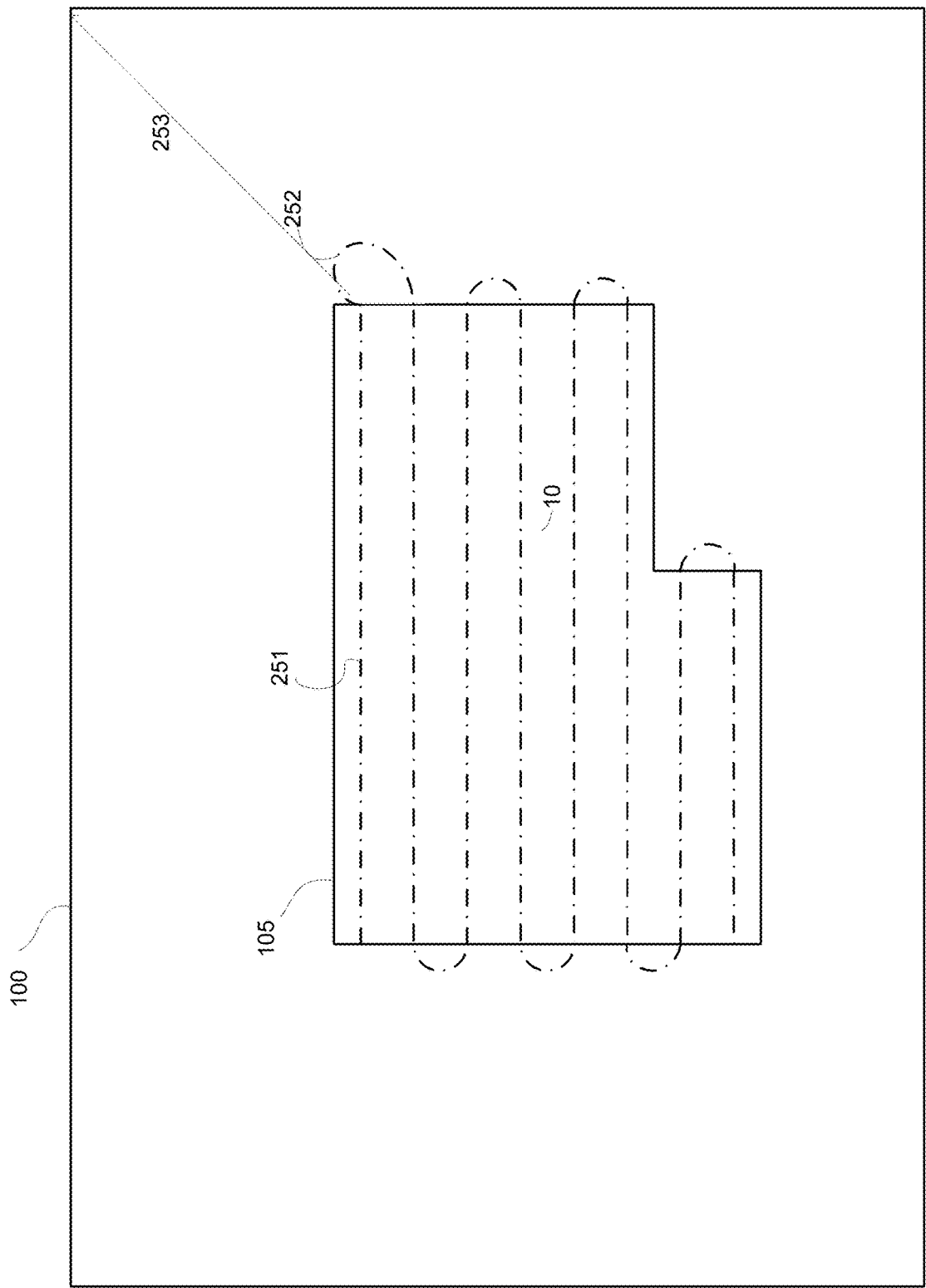
FIG. 17 is an example of a pool cleaning robot, a part of the pool and a cleaning region.

The pool cleaning robot 10 may uses the transition (as shown in FIG. 16) from one line to another line of the raster scan pattern to image a corner of the pool—thereby increase the accuracy of the location determination. The raster scan lines 251 (or at least one line) may be oriented (non-parallel) to first sidewall 101—in order to increase the probability of imaging a corner. The transitions may be defined to place a corner of the pool in the field of view of pool cleaning robot 10 (see for example transition 252 of FIG. 17).

FIG. 16 illustrates a part of the 3D approximation of the sidewalls of the pool. FIG. 16 also shows that parts of both third and fourth sidewalls are within the field of view (201) of the pool cleaning robot 10.

FIG. 16 also illustrates a slippery area 106 detected by the pool cleaning robot 10 (by monitoring an increased propagation speed attributed to the bottom of the pool).

It is noted that the search for imaging of two sidewalls that are oriented to each other may be replaced by searching for other static pool elements that have parts that are oriented to each other.

Figure 18:
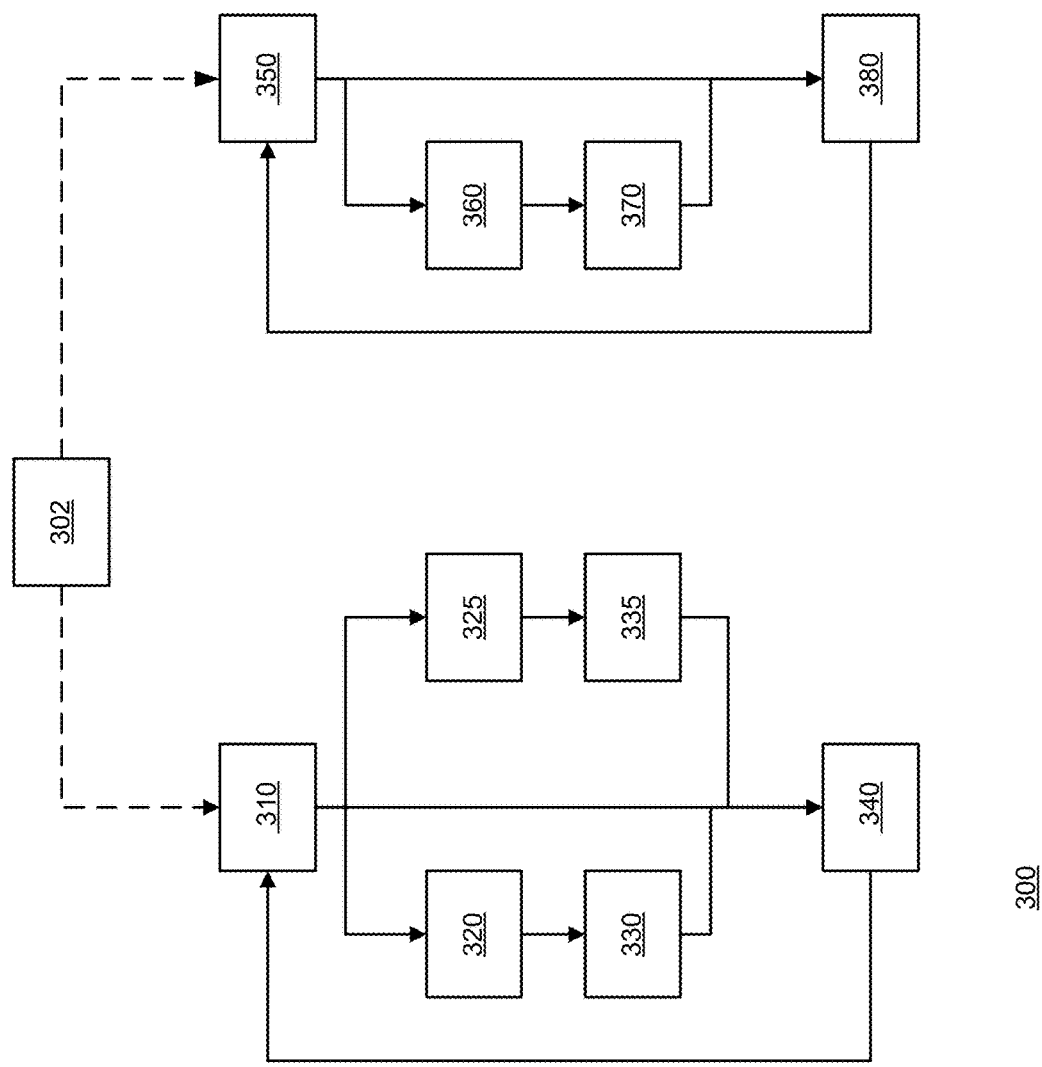
FIG. 18 is an example of a method.

FIG. 18 illustrates method 300 for cleaning a region of a pool, the method may include repeating a first sequence of steps 310 and 340. Thus—the movement of the pool cleaning robot (step 310) may be responsive to the location of the pool cleaning robot—as determined in step 340.

Step 310 may include moving a pool cleaning robot along a cleaning path that covers the region while acquiring, at first different points of time and by a sensing unit of the pool cleaning robot, first images of first scenes, at least one first scene at each first point of time. Covers means that the cleaning path may or may may not exceed the region—but passes through the entire region.

The acquiring of the first images may be executed while illuminating the first scenes by the pool cleaning robot.

Step 340 may include determining, based at least in part of on the first images, first locations of the pool cleaning robot.

The moving of step 310 may be responsive to the first locations of the pool cleaning robot.

The first sequence may also include steps 320 and 330. Step 310 may be followed by a sequence of steps 320 and 330. Step 330 may be followed by step 340.

Step 320 may include detecting, in at least one first image, illumination reflected or scattered as a result of the illuminating of the first scenes.

The illumination reflected or scattered may be reflected or scattered from turbid fluid, from a pool static element and the like.

Step 330 may include removing from the at least one first image information about the illumination reflected or scattered.

The first sequence may also include step 325 of calculating at least one out of a reflection parameter and a scatter parameter of the illumination reflected or scattered from the turbid fluid.

Step 325 may be followed by step 335 of determining at least one illumination parameter based on the at least one out of the reflection parameter and the scatter parameter. Step 335 may be followed by step 310.

The at least one illumination parameter may be a color of illumination and/or an intensity of illumination.

The calculating may be based on one or more images acquired under different illumination conditions.

Method 300 may also include repeating a second sequence of steps 350 and 380. Thus—the movement of the pool cleaning robot (step 350) may be responsive to the location of the pool cleaning robot—as determined in step 380.

Method 300 may include selecting (step 302) between the first sequence and the second sequence. The selection may be time based (for example applying the first sequence at night and applying the second sequence at day time), illumination condition based (applying the first sequence when the illumination in the pool {ambient and/or artificial} is not enough to acquire images of a certain quality), battery resources status based (applying the first sequence when there is enough power to perform the illumination), water condition based (applying the first sequence when the water is tool turbid and illumination is required) and the like.

Step 350 may include moving the pool cleaning robot along the cleaning path while acquiring, at second points of time and by the sensing unit of the pool cleaning robot, second images of second scenes, at least one second scene per point of time. The acquiring of the second images may be executed without illuminating the second scenes by the pool cleaning robot;

Step 380 may include determining, based on the second images of the second scenes, second locations of the pool cleaning robot.

The moving (step 350) may be responsive to the second locations of the pool cleaning robot.

The second sequence may also include steps 360 and 370. Step 350 may be followed by a sequence of steps 360 and 370. Step 370 may be followed by step 380.

Step 360 may include detecting, in at least one image, a flicker.

Step 370 may include removing from the at least one image information about the flicker. This may include removing the flicker, masking pixels of the flicker and the like.

Figure 19:
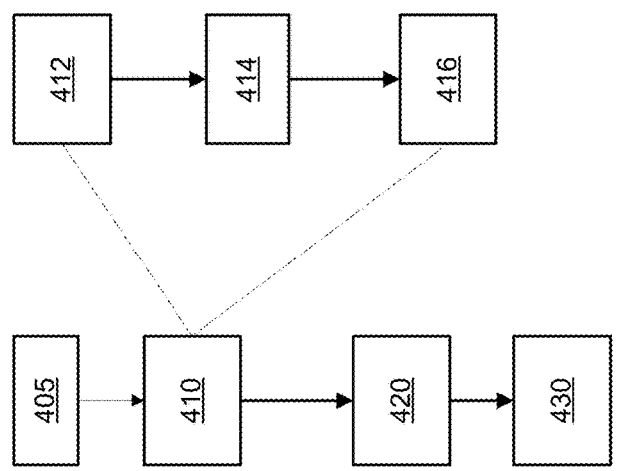
FIG. 19 is an example of a method.

FIG. 19 illustrates method 400 for navigating a pool cleaning robot within a pool. Method 400 may include repetitively executing (executing during multiple points of time) during the navigating of the pool cleaning robot, a sequence of steps 410, 420 and 430.

Step 410 may include concurrently (for example when the pool cleaning robot is substantially at the same location) sensing, by a pool cleaning robot, distances between the pool cleaning robot and static pool elements that may be oriented from each other. The static pool elements may be elements of the pool that are static (ladders, sidewalls, lighting elements, drain, bottom, and the like).

Step 420 of estimating by a pool cleaning robot processor (processor of the pool cleaning robot) a location of the pool cleaning robot within the pool, based on the distances.

Step 430 of determining a future progress of the pool cleaning robot based on the location. For example—progressing along a cleaning path, correcting deviations from a cleaning path.

Step 410 may include acquiring one or more images of the static pool elements by a stereoscopic camera of the robot—or estimating the distances in another manner (for example using other distance sensors).

Step 410 may include step 412 of illuminating a surrounding of the robot to provide an illuminated surrounding, step 414 of acquiring one or more images of the illuminated surrounding. Step 414 may be followed by processing the one or more images to determine whether the surrounding include the one or more static pool elements. The processing may be included in step 420.

Step 412 may include illuminating the illuminated surroundings with different colors, at different points of time, step 414 may include obtaining different color images of the illuminated surroundings, and step 416 may include comparing between the different color images to determine whether the illuminated surroundings includes the one or more static pool elements.

The different colors may include green and another color.

Method 400 may include step 405 of receiving or generating, at least in part by the pool cleaning robot, a three dimensional representation of the pool during a learning period. The 3D representation may include information about the 3D location of points that belong to the pool. The 3D representation may be a cloud of points or any other representation.

Step 410 may be preceded by step 405.

Steps 410 and 420 may include (a) generating, by the pool cleaning robot, and during a progress over a part of the pool, a three dimensional estimate of a portion of the pool; (b) searching a portion of the three dimensional representation of the pool that may be similar (equal, substantially equal, match, best match) to the three dimensional estimate of the portion of the pool; and (c) determining of the location of the pool cleaning robot based on the outcome of the searching.

Figure 20:
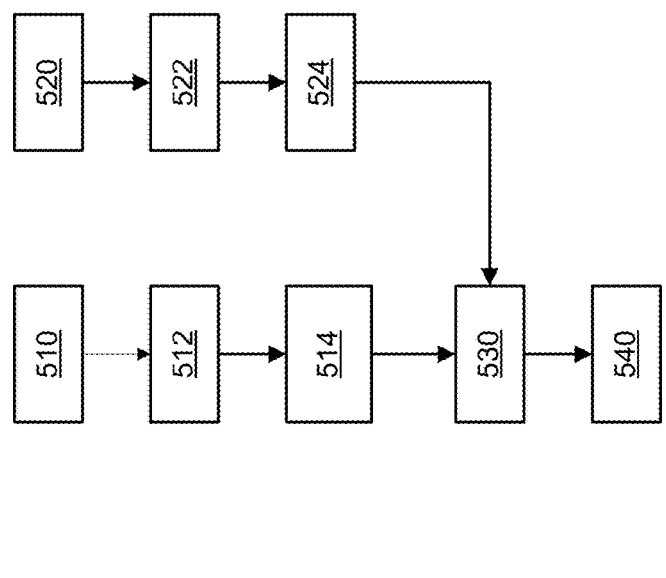
FIG. 20 is an example of a method.

FIG. 20 illustrates method 500.

Method 500 may include various steps—as listed below.

Step 510 may include illuminating a surrounding of a pool cleaning robot with green light to provide a green illuminated scene.

Step 510 may be followed by step 512 of acquiring an image of the green illuminated scene.

Step 512 may be followed by step 514 of estimating a penetration depth of the green light within the surrounding of the pool cleaning robot.

Step 520 may include illuminating the surrounding of the pool cleaning robot with a light of another color to provide another color illuminated scene. The other color differs from green.

Step 520 may be followed by step 522 of acquiring an image of the other color illuminated scene.

Step 542 may be followed by step 524 of estimating a penetration depth of the other light within the surrounding of the pool cleaning robot.

Steps 514 and 524 may be followed by step 530 of comparing between the penetration depth of the green light and the penetration depth of the other light to provide a comparison result.

Step 530 may be followed by step 540 of determining, based on the comparison result, at least one of a location of the pool cleaning robot, and a state of water within the surroundings of the pool cleaning robot.

Step 540 may include determining that the surroundings of the pool cleaning robot may include a sidewall of the pool when the penetration depth of the other light within the surrounding of the pool cleaning robot substantially equals the penetration depth of the green light within the surrounding of the pool cleaning robot.

Step 540 may include determining that the surroundings of the pool cleaning robot does not may include a sidewall of the pool when the penetration depth of the other light within the surrounding of the pool cleaning robot substantially differs from the penetration depth of the green light within the surrounding of the pool cleaning robot.

Figure 21:
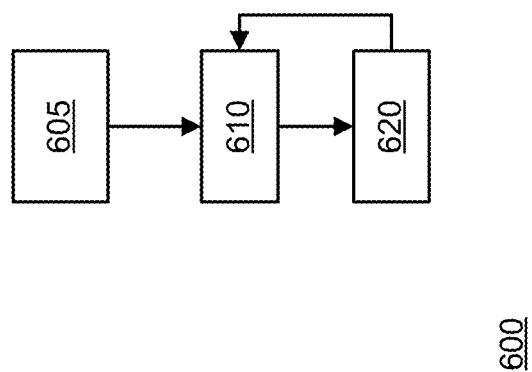
FIG. 21 is an example of a method.

FIG. 21 illustrates an example of method 600.

Method 600 is a method for cleaning a region of the pool.

Method 600 may include the listed below steps.

Step 610 may include moving a pool cleaning robot within the region while repetitively determining a location of the pool cleaning robot based on images acquired by a stereoscopic camera of the pool cleaning robot.

Step 610 may be followed by step 620 of cleaning the region by a pool cleaning robot during the moving of the pool cleaning robot within the region.

Method 600 may include step 605 of receiving or generating, at least in part by the pool cleaning robot, a three dimensional representation of the pool during a learning period.

Step 610 may be preceded by step 605.

Steps 610 and 620 may include (a) generating, by the pool cleaning robot, and during a progress over a part of the pool, a three dimensional estimate of a portion of the pool; (b) searching a portion of the three dimensional representation of the pool that may be similar to the three dimensional estimate of the portion of the pool; and (c) the determining of the location of the pool cleaning robot within the pool may be responsive to an outcome of the searching.

Step 610 may include acquiring the images; and wherein at least one image may be an image of an illuminated surroundings of the pool cleaning robot.

Step 610 may include illuminating a surrounding of the pool cleaning robot with a warm colored illumination (such as a yellow light).

Step 610 may include illuminating a surrounding of the pool cleaning robot with blue light.

Step 610 may include illuminating a surrounding of the pool cleaning robot with green light.

Step 610 may include acquiring the images and filtering our flickers from the images.

Step 610 may include recognizing the flickers by comparing multiple images, taken at different times, of a same scene.

Step 610 may include acquiring the images by the stereoscopic camera, wherein the stereoscopic camera may include two image sensors.

The two image sensor may be followed by at least one fish eye lens.

Any combination of any step of any one of the methods illustrated in the specification may be provided. Any combination of any feature of any claims may be provided. There may be provided a pool cleaning robot that is constructed and arranged to execute any combination of any steps of any of the methods illustrated in the specification. There may be provided a non-transitory computer readable medium that stores instructions for executing any combination of any steps of any of the methods illustrated in the specification.

"Configured" and "constructed and arranged" are used in an interchangeable manner.

The terms "comprising", "including" having" "consisting", and "consisting essentially of" are used in an interchangeable manner.

The phrase "may be" also cover "may not be".

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "rear" "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between various components are merely illustrative and that alternative embodiments may merge various components or impose an alternate decomposition of functionality upon various components. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" Each other such that the desired functionality is achieved, irrespective of architectures or intermedial components. Likewise, any two components so associated can also be viewed as being "operably connected," or "operably coupled," to Each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for cleaning a region of a pool, the method comprises:
    determining a turbidity of a fluid of the pool by illuminating the fluid with different colors, calculating reflection values of the fluid obtained at the different colors, determining an index of reflection based on the reflection values and translating the index of reflection into the turbidity of the fluid;
    selecting, based on the turbidity of fluid of the pool, between acquiring first images of first scenes and acquiring of second images of second scenes;
    when selecting to acquire the second images then:
        moving the pool cleaning robot along a cleaning path that covers the region while acquiring, at second points of time and by a sensing unit of the pool cleaning robot, the second images, at least one second scene per point of time;
        wherein the acquiring of the second images is executed without illuminating the second scenes by the pool cleaning robot;
        detecting, in a given second image, a flicker;
        removing, from the given second image, information about the flicker;
        determining, based on the second images of the second scenes, second locations of the pool cleaning robot; and
        wherein the moving is responsive to the second locations of the pool cleaning robot;
    when selecting to acquire the first images then:
        moving the pool cleaning robot along the cleaning path while acquiring, at first different points of time and by the sensing unit of the pool cleaning robot, the first images, at least one first scene at each first point of time;
        wherein the acquiring of the first images is executed while illuminating the first scenes by the pool cleaning robot;
        detecting, in at least one first image, illumination reflected or scattered from turbid fluid as a result of the illuminating of the first scenes;
        removing from the at least one first image information about the illumination reflected or scattered from the turbid fluid;
        determining, based at least in part of on the first images, first locations of the pool cleaning robot; and
        wherein the moving is responsive to the first locations of the pool cleaning robot.

2. The method according to claim 1 wherein the given second image is acquired at a specific location, and wherein the removing of the flicker from the given second image comprises merging the given second image with previously acquired second images from the specific location.

3. The method according to claim 2 comprising determining at least one illumination parameter based on the at least one out of the reflection parameter and the scatter parameter.

4. The method according to claim 2 wherein the illuminating comprises illuminating different first scenes with different colors.

5. The method according to claim 2 comprising calculating at least one out of a reflection parameter and a scatter parameter of the illumination reflected or scattered.

6. The method according to claim 1 wherein the removing comprising masking pixels of the flicker within the given second image.

7. The method according to claim 1 comprising acquiring the first images by a stereoscopic camera of the sensing unit.

8. A non-transitory computer readable medium that stores instructions that once executed by a pool cleaning robot to cause the pool cleaning robot to execute the steps of:
    determining a turbidity of a fluid of the pool by illuminating the fluid with different colors, calculating reflection values of the fluid obtained at the different colors, determining an index of reflection based on the reflection values and translating the index of reflection into the turbidity of the fluid;
    selecting, based on the turbidity of fluid of the pool, between acquiring first images of first scenes and acquiring of second images of second scenes;
    when selecting to acquire the second images then:
        moving the pool cleaning robot along a cleaning path that covers the region while acquiring, at second points of time and by a sensing unit of the pool cleaning robot, the second images, at least one second scene per point of time;
        wherein the acquiring of the second images is executed without illuminating the second scenes by the pool cleaning robot;
        detecting, in a given second image, a flicker;
        removing, from the given second image, information about the flicker;
        determining, based on the second images of the second scenes, second locations of the pool cleaning robot; and
        wherein the moving is responsive to the second locations of the pool cleaning robot when selecting to acquire the first images then:
    moving the pool cleaning robot along a cleaning path that covers a region of a pool while acquiring, at first different points of time and by a sensing unit of the pool cleaning robot, the first images, at least one first scene at each first point of time;
    wherein the acquiring of the first images is executed while illuminating the first scenes by the pool cleaning robot;
    detecting, in at least one first image, illumination reflected or scattered from turbid fluid as a result of the illuminating of the first scenes;
    removing from the at least one first image information about the illumination reflected or scattered;
    determining, based at least in part of on the first images, first locations of the pool cleaning robot; and
    wherein the moving is responsive to the first locations of the pool cleaning robot.

9. A pool cleaning robot that comprises:
    a housing;
    a filtering unit that is constructed and arranged to filter fluid;
    a fluid control unit that is constructed and arranged to control a flow of the fluid within the pool cleaning robot;
    a sensing unit;
    an illumination unit;
    a processor that is configured to select, based on a turbidity of fluid of the pool, between acquiring first images of first scenes and acquiring of second images of second scenes; and
    a drive system;
    wherein the drive system is constructed and arranged to move the pool cleaning robot along a cleaning path that covers a region;
    wherein the pool cleaning robot is constructed and arranged to determine the turbidity of the fluid by illuminating the fluid with different colors, calculating reflection values of the fluid obtained at the different colors, determining an index of reflection based on the reflection values and translating the index of reflection into the turbidity of the fluid;

when selecting to acquire the first images then:

the sensing unit is constructed and arranged to acquire the first images, at first different points of time, while the pool cleaning robot moves along the cleaning path, and while the illumination unit illuminates the first scenes; wherein at least one first scene is acquired at each first point of time;

the processor is constructed and arranged to:

detect, in at least one first image, illumination reflected or scattered from turbid fluid as a result of the illuminating of the first scenes;

remove from the at least one first image information about the illumination reflected or scattered;

determine, based at least in part of on the first images, first locations of the pool cleaning robot; and determine a manner of moving the pool cleaning robot in response to the first locations of the pool cleaning robot;

when selecting to acquire the second images then:

the sensing unit is constructed and arranged to acquire the second images, while the pool cleaning robot moves along the cleaning path, at second points of time, at least one second scene per point of time; wherein the acquiring of the second images is executed without illuminating the second scenes by the pool cleaning robot;

wherein the processor is constructed and arranged to:

detect, in a given second image, a flicker;

remove, from the given second image, information about the flicker;

determine, based on the second images of the second scenes, second locations of the pool cleaning robot; and determine a manner of moving the pool cleaning robot in response to the second locations of the pool cleaning robot.

10. The pool cleaning robot according to claim 9 wherein the processor is constructed and arranged to calculate at least one out of a reflection parameter and a scatter parameter of the illumination reflected or scattered.

11. The pool cleaning robot according to claim 9 wherein the processor is constructed and arranged to remove the flicker by masking pixels of the flicker of the second given image.

12. The method according to claim 1 wherein the detecting of the flicker comprises comparing between a pair of images acquired simultaneously by a stereoscopic camera of the sensing unit.

* * * * *